US006981058B2

(12) United States Patent
Lin et al.

(10) Patent No.: US 6,981,058 B2
(45) Date of Patent: *Dec. 27, 2005

(54) SYSTEM AND METHOD FOR SLOT BASED ARL TABLE LEARNING WITH CONCURRENT TABLE SEARCH USING WRITE SNOOP

(75) Inventors: Jonathan Lin, Fremont, CA (US); David Billings, Campbell, CA (US)

(73) Assignee: Broadcom Corporation, Irvine, CA (US)

( * ) Notice: Subject to any disclaimer, the term of this patent is extended or adjusted under 35 U.S.C. 154(b) by 683 days.

This patent is subject to a terminal disclaimer.

(21) Appl. No.: 10/083,594

(22) Filed: Feb. 27, 2002

(65) Prior Publication Data

US 2002/0133623 A1 Sep. 19, 2002

Related U.S. Application Data

(60) Provisional application No. 60/273,515, filed on Mar. 7, 2001.

(51) Int. Cl.$^7$ .......................................... G06F 15/173
(52) U.S. Cl. ..................... 709/242; 707/3; 370/395.31
(58) Field of Search ........................ 709/242, 244–245, 709/214; 707/3, 10, 8; 370/395.31, 392; 711/148–149

(56) References Cited

U.S. PATENT DOCUMENTS

| | | | | |
|---|---|---|---|---|
| 5,524,254 A | * | 6/1996 | Morgan et al. ............. 709/245 |
| 5,940,597 A | * | 8/1999 | Chung ......................... 709/242 |
| 6,049,834 A | * | 4/2000 | Khabardar et al. ......... 709/242 |
| 6,308,218 B1 | * | 10/2001 | Vasa ........................... 709/238 |
| 6,345,302 B1 | * | 2/2002 | Bennett et al. ............. 709/236 |
| 6,446,173 B1 | * | 9/2002 | Pham ......................... 711/147 |
| 6,683,885 B1 | * | 1/2004 | Sugai et al. ................ 370/423 |
| 6,798,777 B1 | * | 9/2004 | Ferguson et al. ........... 370/392 |
| 6,813,620 B2 | * | 11/2004 | Lin et al. ...................... 707/10 |
| 6,816,490 B1 | * | 11/2004 | Chung ......................... 370/392 |
| 6,820,134 B1 | * | 11/2004 | Zinin et al. ................. 709/238 |

* cited by examiner

Primary Examiner—Abdullahi E. Salad
(74) Attorney, Agent, or Firm—Squire, Sanders & Dempsey L.L.P.

(57) ABSTRACT

A network device including at least one network port, a clock, address resolution logic (ARL) tables, and address resolution logic. The clock generates a timing signal. The ARL tables are configured to store and maintain data related to port addresses of the network device. The address resolution logic is coupled to the ARL tables and the clock, and configured to search the ARL tables and to perform learning concurrently during alternating slots of the timing signal. Upon receiving a data packet at the at least one port, the address resolution logic is configured to search the ARL tables for a destination address based on the data packet. When the destination address is found, the address resolution logic is configured to update a related record of the ARL tables based on the learning, the address resolution logic configured to perform searches and updates.

26 Claims, 13 Drawing Sheets

Fig. 4

PROTOCOL CHANNEL MESSAGES

| 30 | 28 | 26 | 24 | 22 | 20 | 18 | 16 | 14 | 12 | 10 | 8 | 6 | 4 | 2 | 0 |
|---|---|---|---|---|---|---|---|---|---|---|---|---|---|---|---|
| OP CODE | I P | P X | RESERVED | NXT CELL | SRC DEST PORT | | COS | J | S E | CRC | P | O | LEN | | |

| 30 | 28 | 26 | 24 | 22 | 20 | 18 | 16 | 14 | 12 | 10 | 8 | 6 | 4 | 2 | 0 |
|---|---|---|---|---|---|---|---|---|---|---|---|---|---|---|---|
| RESERVED | | | | | | | | | | | | | | | |

| 30 | 28 | 26 | 24 | 22 | 20 | 18 | 16 | 14 | 12 | 10 | 8 | 6 | 4 | 2 | 0 |
|---|---|---|---|---|---|---|---|---|---|---|---|---|---|---|---|
| U | RES | | | UNTAGGED PORTBITMAP | | | | | BC/MC PORTBITMAP | | | | | | |

| 30 | 28 | 26 | 24 | 22 | 20 | 18 | 16 | 14 | 12 | 10 | 8 | 6 | 4 | 2 | 0 |
|---|---|---|---|---|---|---|---|---|---|---|---|---|---|---|---|
| | | | CPU OPCODES | | | | | UNTAGGED PORTBITMAP/SRC PORT NUMBER (BIT 0..5) | | | TIME STAMP | | | | |

Fig. 5

SIDE BAND CHANNEL MESSAGES

| 30 | 28 | 26 | 24 | 22 | 20 | 18 | 16 | 14 | 12 | 10 | 8 | 6 | 4 | 2 | 0 |
|----|----|----|----|----|----|----|----|----|----|----|---|---|---|---|---|
| OPCODE | | | DEST PORT/ DESTINATION DEV ID | | | SRC PORT | | | DATA LEN | | | E | E CODE | COS | 0 |
| ADDRESS | | | | | | | | | | | | | | | |
| DATA | | | | | | | | | | | | | | | |

SYSTEM AND METHOD FOR SLOT BASED ARL TABLE LEARNING WITH CONCURRENT TABLE SEARCH USING WRITE SNOOP

REFERENCE TO RELATED APPLICATIONS

This application claims priority of U.S. Provisional Patent Application Ser. No. 60/273,515 entitled "Slot Based ARL Table Learning with Concurrent Table Search Using Insertion Write Snoop," filed on Mar. 7, 2001, the contents of which are hereby incorporated by reference.

BACKGROUND OF THE INVENTION

1. Field of the Invention

The invention relates to systems and methods for searching and updating memory concurrently within a network device. In particular, the invention relates to systems and methods of searching memory banks simultaneously while updating, inserting, and bubble sorting records within a network device, such as a high performance network switch.

2. Description of the Related Art

As computer performance has increased in recent years, the demands on computer networks has significantly increased; faster computer processors and higher memory capabilities need networks with high bandwidth capabilities to enable high speed transfer of significant amounts of data. The well-known Ethernet technology, which is based upon numerous IEEE Ethernet standards, is one example of computer networking technology which has been able to be modified and improved to remain a viable computing technology. A more complete discussion of prior art networking systems can be found, for example, in SWITCHED AND FAST ETHERNET, by Breyer and Riley (Ziff-Davis, 1996), and numerous IEEE publications relating to IEEE 802 standards. Based upon the Open Systems Interconnect (OSI) 7-layer reference model, network capabilities have grown through the development of repeaters, bridges, routers, and, more recently, "switches", which operate with various types of communication media. Thickwire, thinwire, twisted pair, and optical fiber are examples of media which has been used for computer networks. Switches, as they relate to computer networking and to ethernet, are hardware-based devices which control the flow of data packets or cells based upon destination address information which is available in each packet. A properly designed and implemented switch should be capable of receiving a packet and switching the packet to an appropriate output port at what is referred to wirespeed or linespeed, which is the maximum speed capability of the particular network. Current basic Ethernet wirespeeds typically range from 10 Megabits per second (Mps) up to 10,000 Mps, or 10 Gigabits per second. As speed has increased, design constraints and design requirements have become more and more complex with respect to following appropriate design and protocol rules and providing a low cost, commercially viable solution.

Competition and other market pressures require the production of more capable network devices that cost less. Increased network and device speed is required by customers.

Network performance, i.e., increased device speed and decreased data packet latency, is directly related to the time that it takes for devices to search memory in conjunction with relaying a packet, e.g. a switch searching memory tables for destination addresses, rules, etc. Additionally, the time it takes to update the records may hinder performance by interrupting searches. Accordingly, in order to support high performance network solutions, new and improved systems and methods are needed for searching memory banks within network devices concurrently while updating the same memory, such as within a high performance switch.

SUMMARY OF THE INVENTION

According to an embodiment of the present invention, a network device is provided. The network device includes at least one network port, a clock, address resolution logic (ARL) tables, and address resolution logic. The clock generates a timing signal. The ARL tables are configured to store and maintain network address data. The address resolution logic is coupled to the ARL tables and to the clock, and configured to search the ARL tables and to perform updates and inserts to the ARL tables based on a learning function. The searching and the updates and inserts are performed concurrently during alternating slots of the timing signal. The address resolution logic is configured to search the ARL tables for a destination address based on a data packet received at a port of the at least one port, and when the search returns a destination address, the address resolution logic is configured to update a related record of the ARL tables based on the learning function.

According to an embodiment of the present invention, a method is provided for performing searching and learning concurrently within a network device. The method includes a step of providing a network device comprising at least one port, ARL tables configured to store and maintain data related to port addresses of the network device, and address resolution logic configured to update and insert data into the ARL tables based on a learning function. The method also includes a steps of receiving a timing signal, receiving a data packet at a port of the at least one port, and initiating a search in the ARL tables based on the packet. The method also includes a step of performing the search concurrently with and updates to the ARL tables related to the learning function. The searches and updates being performed during alternating slots of the timing signal.

According to an embodiment of the present invention, a network device is provided. The network device including at least one network port, a clock means for generating a timing signal, address resolution logic (ARL) table means, and address resolution logic means. The ARL table means are for storing and maintaining network address data. The address resolution logic means are for coupling to the ARL tables and the clock, and for searching the ARL tables and perform updates and inserts to the ARL tables based on a learning function. The searching and the updates and inserts are performed concurrently during alternating slots of the timing signal. The address resolution logic means is configured to search the ARL table means for a destination address based on a data packet received at a port of the at least one port, and when the search returns a destination address, the address resolution logic means is configured to update a related record of the ARL table means based on the learning function.

BRIEF DESCRIPTION OF THE DRAWINGS

The objects and features of the invention will be more readily understood with reference to the following description and the attached drawings, wherein:

FIG. 4 illustrates P-channel message types according to an embodiment of the present invention;

FIG. 5 illustrates a message format for S channel message types according to an embodiment of the present invention;

DETAILED DESCRIPTION OF THE PREFERRED EMBODIMENTS

Figure 1:
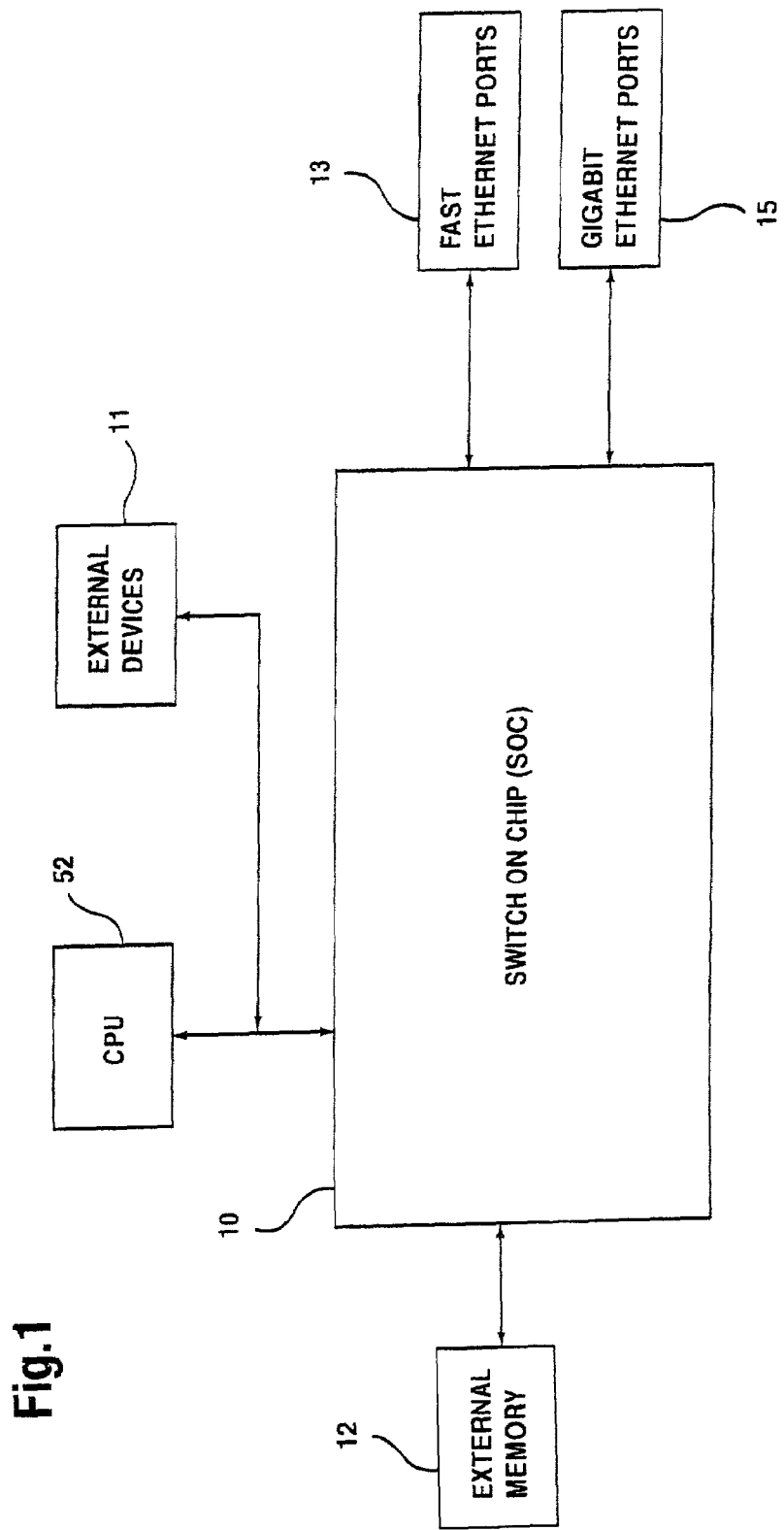
FIG. 1 is a general block diagram of an exemplary network device according to the invention.

FIG. 1 is a basic block diagram of an exemplary high-speed network device to which the present invention is applicable. An exemplary configuration of a network switch is shown. A switch-on-chip (SOC) 10 is functionally connected to external devices 11, external memory 12, fast ethernet ports 13, and gigabit ethernet ports 15. For the purposes of this discussion, fast ethernet ports 13 will be considered low speed ethernet ports, since they may be capable of operating at speeds ranging from 10 Mbps to 100 Mbps in this example, while the gigabit ethernet ports 15, which are high speed ethernet ports, are capable of operating at 1000 Mbps or higher in this example, and preferably 2500 Mbps. External devices 11 could include other switching devices for expanding switching capabilities, or other devices as may be required by a particular application. External memory 12 can be additional off-chip memory, which is in addition to internal memory (on-chip) which is located on SOC 10, which will be discussed below. CPU 52 can be used as desired to program SOC 10 with rules which are appropriate to control packet processing. However, once SOC 10 is appropriately programmed or configured, SOC 10 operates, as much as possible, in a free running manner without communicating with CPU 52. CPU 52 does not control every aspect of the operation of SOC 10, because CPU 52 performance requirements in this example, at least with respect to SOC 10, are fairly low. A less powerful and therefore less expensive CPU 52 can therefore be used when compared to other network switches. As also will be discussed below, SOC 10 utilizes external memory 12 in an efficient manner so that the cost and performance requirements of memory 12 can be reduced. Internal memory on SOC 10, as will be discussed below, could also be configured to maximize switching throughput and minimize costs.

It should be noted that port speeds described are merely exemplary and ports may be configured to handle a variety of speeds faster and slower.

Figure 2:
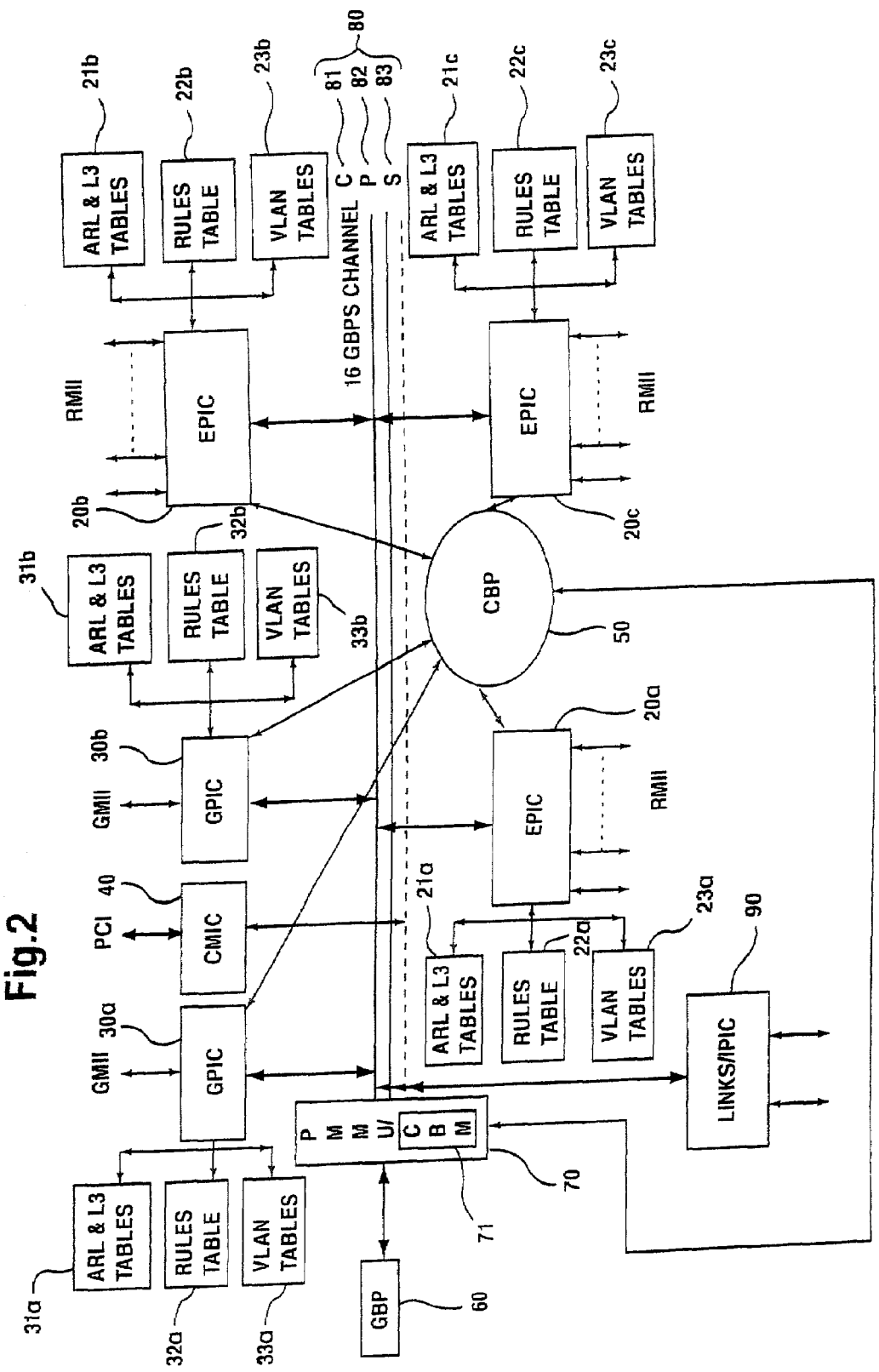
FIG. 2 is a detailed block diagram of a network switch according to the invention.

FIG. 2 illustrates a more detailed block diagram of the functional elements of SOC 10. As evident from FIG. 2 and as noted above, SOC 10 includes a plurality of modular systems on-chip, with each modular system, although being on the same chip, being functionally separate from other modular systems. Therefore, each module can efficiently operate in parallel with other modules, and this configuration enables a significant amount of freedom in updating and re-engineering SOC 10. However, other switch configurations or network device configurations may be utilized to produce the present invention.

SOC 10 may include a plurality of Ethernet Port Interface Controllers (EPIC) 20a, 20b, 20c, etc., a plurality of Gigabit Port Interface Controllers (GPIC) 30a, 30b, etc., a CPU Management Interface Controller (CMIC) 40, a Common Buffer Memory Pool (CBP) 50, a Pipelined Memory Management Unit (PMMU) 70, including a Common Buffer Manager (CBM) 71, and a system-wide bus structure referred to as CPS channel 80. The PMMU 70 includes memory management means and communicates with external memory 12, which includes a Global Buffer Memory Pool (GBP) 60. The CPS channel 80 comprises C channel 81, P channel 82, and S channel 83. The CPS channel is also referred to as the Cell Protocol Sideband Channel, and is a 17 Gbps channel which glues or interconnects the various modules together. As also illustrated in FIG. 2, other high speed interconnects can be provided, as shown as an extendible high speed interconnect. In one configuration, this interconnect can be in the form of an interconnect port interface controller (IPIC) 90, which is capable of interfacing CPS channel 80 to external devices 11 through an extendible high speed interconnect link. As will be discussed below, each EPIC 20a, 20b, and 20c, generally referred to as EPIC 20, and GPIC 30a and 30b, generally referred to as GPIC 30, are closely interrelated with appropriate address resolution logic and layer three switching tables 21a, 21b, 21c, 31a, 31b, rules tables 22a, 22b, 22c, 31a, 31b, and VLAN tables 23a, 23b, 23c, 31a, 31b. These tables will be generally referred to as 21, 31, 22, 32, 23, 33, respectively. These tables, like other tables on SOC 10, can be implemented in silicon as two-dimensional arrays.

EPIC 20 may support a number of fast ethernet ports 13 (8 are shown as an example), and switches packets to and/or from these ports as may be appropriate. The ports, therefore, are connected to the network medium (coaxial, twisted pair, fiber, etc.) using known media connection technology, and communicates with the CPS channel 80 on the other side thereof. The interface of each EPIC 20 to the network medium can be provided through a Reduced Media Internal Interface (RMII), which enables the direct medium connection to SOC 10. As is known in the art, auto-negotiation is an aspect of fast ethernet, wherein the network is capable of negotiating a highest communication speed between a source and a destination based on the capabilities of the respective devices. The communication speed can vary, as noted previously, for example, between 10 Mbps and 100 Mbps, as an example. Auto-negotiation capability, therefore, is built directly into each EPIC 20 or GPIC 30 module. The address resolution logic (ARL) and layer three tables (ARL/L3) 21a, 21b, 21c, rules table 22a, 22b, 22c, and VLAN tables 23a, 23b, and 23c are configured to be part of, or interface with the associated EPIC in an efficient and expedient manner, in order to support wirespeed packet flow. The on-chip memory which is searched in accordance with the present invention may comprise these tables, as is described below in more detail.

Each EPIC 20 and GPIC 30 has separate ingress and egress functions. On the ingress side, self-initiated and CPU-initiated learning of level 2 address information can occur. Address resolution logic (ARL) is configured to insert and update data in the ARL tables to assist the learning function. Address aging is built in as a feature, in order to eliminate the storage of address information which is no longer valid or useful. Aging is described in further detail below. The EPIC and GPIC can also carry out layer 2 mirroring. A fast filtering processor (FFP) 141 (see FIG. 3) may be incorporated into the EPIC, in order to accelerate packet forwarding and enhance packet flow.

Figure 8:
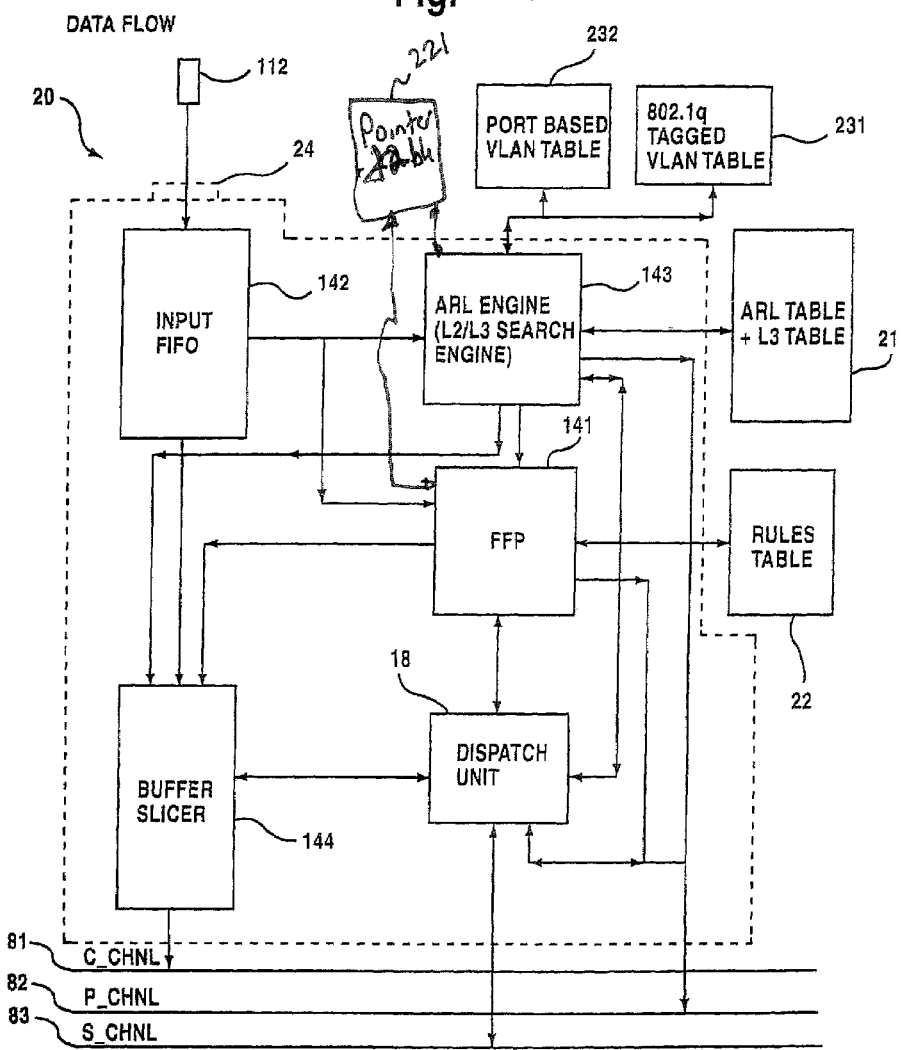
FIG. 8 illustrates an operational diagram of an EPIC module.

The ingress side of each EPIC and GPIC, illustrated in FIG. 8 as ingress submodule 14, has a significant amount of complexity to be able to properly process a significant number of different types of packets which may come in to the port, for linespeed buffering and then appropriate transfer to the egress. Functionally, each port on each module of SOC 10 can have a separate ingress submodule 14 associated therewith. From an implementation perspective, however, in order to minimize the amount of hardware implemented on the single-chip SOC 10, common hardware elements in the silicon can be used to implement a plurality of ingress submodules on each particular module. The configuration of SOC 10 discussed herein enables concurrent lookups and filtering. Layer two lookups, Layer three lookups and filtering occur simultaneously to achieve a high level of performance, which are described in better detail below. On the egress side, the EPIC and GPIC are capable of supporting packet polling based either as an egress management or class of service (COS) function. Rerouting/scheduling of packets to be transmitted can occur, as well as head-of-line (HOL) blocking notification, packet aging, cell reassembly, and other functions associated with ethernet port interface.

Each GPIC 30 is similar to each EPIC 20, but in this embodiment, supports only one 2.5 gigabit ethernet port, and utilizes a port-specific ARL table, rather than utilizing an ARL table which is shared with any other ports. Additionally, instead of an RMII, each GPIC port interfaces to the network medium utilizing a gigabit media independent interface (GMII).

A CMIC 40 can act as a gateway between the SOC 10 and the host CPU. The communication can be, for example, along a PCI bus, or other acceptable communications bus. CMIC 40 can provide sequential direct mapped accesses between the host CPU 52 and the SOC 10. CPU 52, through the CMIC 40, will be able to access numerous resources on SOC 10, including MIB counters, programmable registers, status and control registers, configuration registers, ARL tables, port-based VLAN tables, IEEE 802.1q VLAN tables, layer three tables, rules tables, CBP address and data memory, as well as GBP address and data memory. Optionally, the CMIC 40 can include DMA support, DMA chaining and scatter-gather, as well as master and target PCI64.

Common buffer memory pool or CBP 50 can be considered to be on-chip data memory. In one configuration, the CBP 50 can be first level high speed SRAM memory, to maximize performance and minimize hardware overhead requirements. The CBP can have a size of, for example, 720 kilobytes running at 132 MHz. Packets stored in the CBP 50 are typically stored as cells, rather than packets. As illustrated in the figure, PMMU 70 also contains the Common Buffer Manager (CBM) 71 thereupon. CBM 71 can handle receiving search requests and queue management, and can be responsible for assigning cell pointers to incoming cells, as well as assigning common packet IDs (CPID) once the packet is fully written into the CBP. CBM 71 can also handle management of the on-chip free address pointer pool, control actual data transfers to and from the data pool, and provide memory budget management. The preceding discussion is an exemplary configuration of an exemplary device, and is not meant to limit the present invention. Accordingly, other functions or facilities may be implemented as memory management units or queue management units in accordance with the present invention.

Global memory buffer pool or GBP 60 can act as a second level memory, and can be located on-chip or off chip. In one configuration, GBP 60 is located off chip with respect to SOC 10. When located off-chip, GBP 60 is considered to be a part of or all of external memory 12. As a second level memory, the GBP can be high speed SRAMs, or can be a slower less expensive memory such as DRAM or any other suitable memory type. The GBP can be tightly coupled to the PMMU 70, and operates like the CBP in that packets are stored as cells. For broadcast and multicast messages, only one copy of the packet is stored in GBP 60.

PMMU 70 can be located between GBP 60 and CPS channel 80, and acts as an external memory interface. In order to optimize memory utilization, PMMU 70 includes multiple read and write buffers, and supports numerous functions including global queue management, which broadly includes assignment of cell pointers for rerouted incoming packets, maintenance of the global FAP, time-optimized cell management, global memory budget management, GPID assignment and egress manager notification, write buffer management, read pre-fetches based upon egress manager/class of service requests, and smart memory control.

As shown in FIG. 2, the CPS channel 80 can be actually three separate channels, referred to as the C-channel, the P-channel, and the S-channel. The C-channel can be 128 bits wide and run at 132 MHz. Packet transfers between ports occur on the C-channel. Since this channel is used solely for data transfer, there is no overhead associated with its use. The P-channel or protocol channel is synchronous or locked with the C-channel. During cell transfers, the message header is sent via the P-channel by the PMMU. The P-channel can be 32 bits wide and run at 132 MHz.

The S or sideband channel can run, for example, at 132 MHz and be 32 bits wide. Any suitable width and speed is feasible. The S-channel can be used for functions such as for conveying Port Link Status, receive port full, port statistics, ARL table synchronization, memory and register access to CPU and other CPU management functions, relaying rate control messages and global memory full and common memory full notification.

Figure 3:
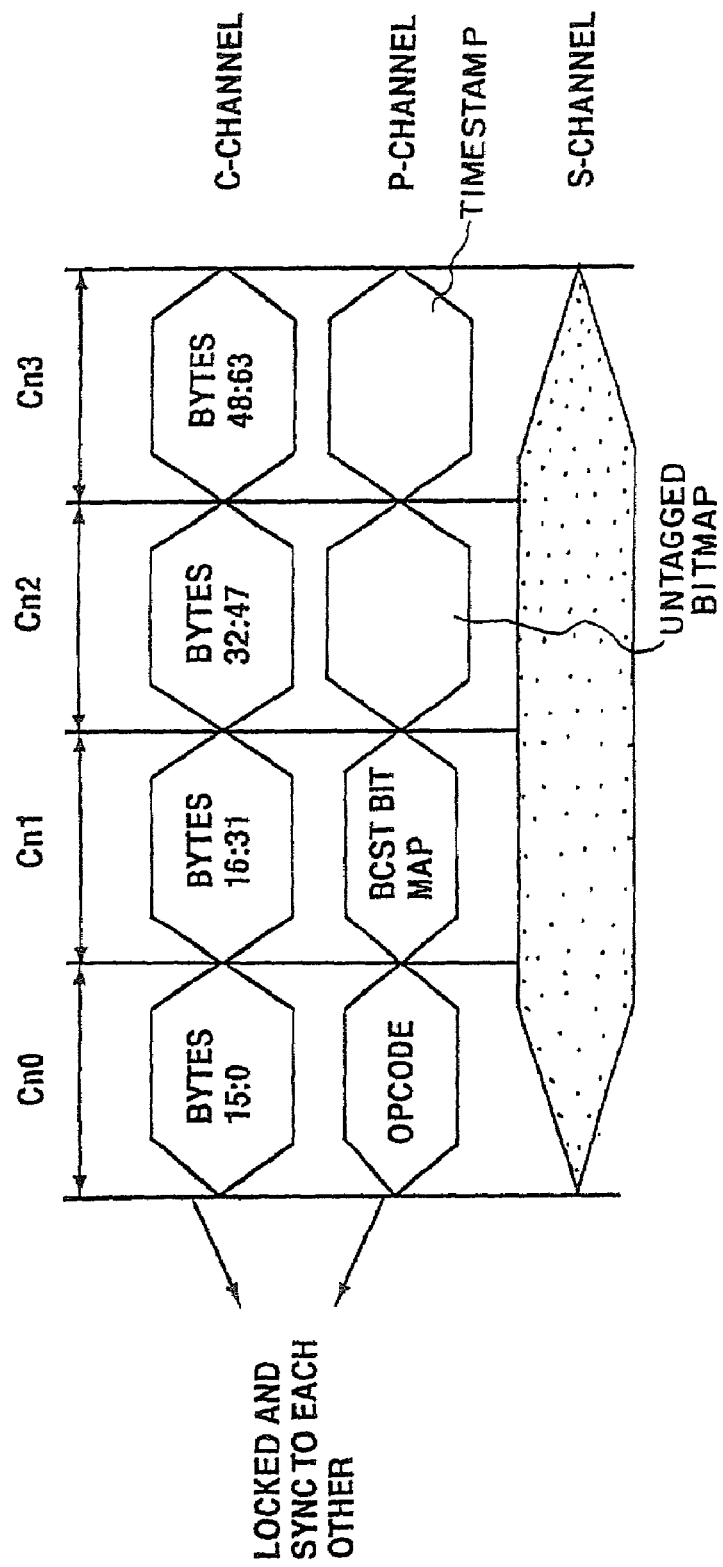
FIG. 3 illustrates the data flow on the CPS channel of a network switch according to an embodiment of the present invention.

A proper understanding of the operation of SOC 10 requires a proper understanding of the operation of CPS channel 80. Referring to FIG. 3, it can be seen that in SOC 10, on the ingress, packets are sliced by an EPIC 20 or GPIC 30 into 64-byte cells. The use of cells on-chip instead of packets makes it easier to adapt the SOC to work with cell based protocols such as, for example, Asynchronous Transfer Mode (ATM). Presently, however, ATM utilizes cells which are 53 bytes long, with 48 bytes for payload and 5 bytes for header. In this example of SOC 10, incoming packets are sliced into cells which are 64 bytes long as discussed above, and the cells are further divided into four separate 16 byte cell blocks Cn0 . . . Cn3. Locked with the C-channel is the P-channel, which locks the opcode in synchronization with Cn0. A port bit map is inserted into the P-channel during the phase Cn1. The untagged bit map is inserted into the P-channel during phase Cn2, and a time stamp is placed on the P-channel in Cn3. Independent from occurrences on the C and P-channel, the S-channel is used as a sideband, and is therefore decoupled from activities on the C and P-channel.

Cell or C-Channel

Arbitration for the CPS channel occurs out of band. Every module (EPIC, GPIC, etc.) monitors the channel, and matching destination ports respond to appropriate transactions. C-channel arbitration is a demand priority round robin arbitration mechanism. If no requests are active, however, the default module, which can be selected during the configuration of SOC 10, can park on the channel and have complete access thereto. If all requests are active, the configuration of SOC 10 is such that the PMMU is granted access every other cell cycle, and EPICs 20 and GPICs 30 share equal access to the C-channel on a round robin basis. FIGS. 4A and 4B illustrate a C-channel arbitration mechanism wherein section A is the PMMU, and section B consists of two GPICs and three EPICs. The sections alternate access, and since the PMMU is the only module in section A, it gains access every other cycle. The modules in section B, as noted previously, obtain access on a round robin basis.

Protocol or P-Channel

Referring once again to the protocol or P-channel, a plurality of messages can be placed on the P-channel in order to properly direct flow of data flowing on the C-channel. Supposing P-channel 82 is 32 bits wide, and a message typically requires 128 bits, four smaller 32 bit messages can be put together in order to form a complete P-channel message. The following list identifies some examples of the fields and function and examples of the various bit counts of the 128 bit message on the P-channel.

Opcode—2 bits long—Identifies the type of message present on the C channel 81;

IP Bit—1 bit long—This bit is set to indicate that the packet is an IP switched packet;

IPX Bit—1 bit long—This bit is set to indicate that the packet is an IPX switched packet;

Next Cell—2 bits long—A series of values to identify the valid bytes in the corresponding cell on the C channel 81;

SRC DEST Port—6 bits long—Defines the port number which sends the message or receives the message, with the interpretation of the source or destination depending upon Opcode;

Cos—3 bits long—Defines class of service for the current packet being processed;

J—1 bit long—Describes whether the current packet is a jumbo packet;

S—1 bit long—Indicates whether the current cell is the first cell of the packet;

E—1 bit long—Indicates whether the current cell is the last cell of the packet;

CRC—2 bits long—Indicates whether a Cyclical Redundancy Check (CRC) value should be appended to the packet and whether a CRC value should be regenerated;

P Bit—1 bit long—Determines whether MMU should Purge the entire packet;

Len—7 bytes—Identifies the valid number of bytes in current transfer;

O—2 bits—Defines an optimization for processing by the CPU 52; and

Bc/Mc Bitmap—28 bits—Defines the broadcast or multicast bitmap. Identifies egress ports to which the packet should be set, regarding multicast and broadcast messages.

Untag Bits/Source Port—28/5 bits long—Depending upon Opcode, the packet is transferred from Port to MMU, and this field is interpreted as the untagged bit map. A different Opcode selection indicates that the packet is being transferred from MMU to egress port, and the last six bits of this field is interpreted as the Source Port field. The untagged bits identifies the egress ports which will strip the tag header, and the source port bits identifies the port number upon which the packet has entered the switch;

U Bit–1 bit long–For a particular Opcode selection (0x01, this bit being set indicates that the packet should leave the port as Untagged; in this case, tag stripping is performed by the appropriate MAC;

CPU Opcode—18 bits long—These bits are set if the packet is being sent to the CPU for any reason. Opcodes are defined based upon filter match, learn bits being set, routing bits, destination lookup failure (DLF), station movement, etc;

Time Stamp—14 bits—The system puts a time stamp in this field when the packet arrives, with a granularity of 1 $\mu$sec.

The opcode field of the P-channel message defines the type of message currently being sent. While the opcode is currently shown as having a width of 2 bits, the opcode field can be widened as desired to account for new types of messages as may be defined in the future. Graphically, however, the P-channel message type defined above is shown in FIG. 4.

An early termination message is used to indicate to CBM 71 that the current packet is to be terminated. During operation, as discussed in more detail below, the status bit (S) field in the message is set to indicate the desire to purge the current packet from memory. Also, in response to the status bit, all applicable egress ports would purge the current packet prior to transmission.

The Src Dest Port field of the P-channel message, as stated above, define the destination and source port addresses, respectively. Each field is 6 bits wide and therefore allows for the addressing of sixty-four ports.

The CRC field of the message is two bits wide and defines CRC actions. Bit 0 of the field provides an indication whether the associated egress port should append a CRC to the current packet. An egress port would append a CRC to the current packet when bit 0 of the CRC field is set to a logical one. Bit 1 of the CRC field provides an indication whether the associated egress port should regenerate a CRC for the current packet. An egress port would regenerate a CRC when bit 1 of the CRC field is set to a logical one. The CRC field is only valid for the last cell transmitted as defined by the E bit field of P-channel message set to a logical one.

As with the CRC field, the status bit field (st), the Len field, and the Cell Count field of the message are only valid in this example for the last cell of a packet being transmitted as defined by the E bit field of the message.

Last, the time stamp field of the message in this example has a resolution of 1 $\mu$s and is valid only for the first cell of the packet defined by the S bit field of the message. A cell is defined as the first cell of a received packet when the S bit field of the message is set to a logical one value.

The C channel 81 and the P channel 82 are synchronously tied together such that data on C channel 81 is transmitted over the CPS channel 80 while a corresponding P channel message is simultaneously transmitted.

S-Channel or Sideband Channel

The S channel 83 can be a 32-bit wide channel which provides a separate communication path within the SOC 10. The S channel 83 is used for management by CPU 52, SOC 10 internal flow control, and SOC 10 inter-module messaging. The S channel 83 is a sideband channel of the CPS channel 80, and is electrically and physically isolated from the C channel 81 and the P channel 82. It is important to note that since the S channel is separate and distinct from the C channel 81 and the P channel 82, operation of the S channel 83 can continue without performance degradation related to the C channel 81 and P channel 82 operation. Conversely, since the C channel is not used for the transmission of system messages, but rather only data, there is no overhead associated with the C channel 81 and, thus, the C channel 81 is able to free-run as needed to handle incoming and outgoing packet information.

The S channel 83 of CPS channel 80 provides a system wide communication path for transmitting system messages, for example, providing the CPU 52 with access to the control structure of the SOC 10. System messages include port status information, including port link status, receive port full, and port statistics, ARL table 22 synchronization, CPU 52 access to GBP 60 and CBP 50 memory buffers and SOC 10 control registers, and memory full notification corresponding to GBP 60 and/or CBP 50.

FIG. 5 illustrates an exemplary message format for an S channel message on S channel 83. The message is formed of four 32-bit words; the bits of the fields of the words are defined as follows:

Opcode—6 bits long—Identifies the type of message present on the S channel;
Dest Port—6 bits long—Defines the port number to which the current S channel message is addressed;
Src Port—6 bits long—Defines the port number of which the current S channel message originated;
COS—3 bits long—Defines the class of service associated with the current S channel message; and
C bit—1 bit long—Logically defines whether the current S channel message is intended for the CPU 52.
Error Code—2 bits long—Defines a valid error when the E bit is set;
DataLen—7 bits long—Defines the total number of data bytes in the Data field;
E bit—1 bit long—Logically indicates whether an error has occurred in the execution of the current command as defined by opcode;
Address—32 bits long—Defines the memory address associated with the current command as defined in opcode;
Data—0–127 bits long—Contains the data associated with the current opcode.

With the configuration of CPS channel 80 as explained above, the decoupling of the S channel from the C channel and the P channel is such that the bandwidth on the C channel can be preserved for cell transfer, and that overloading of the C channel does not affect communications on the sideband channel.

SOC Operation

The configuration of the SOC 10 can support fast Ethernet ports, gigabit ports, and extendible interconnect links as discussed above. The SOC configuration can also be "stacked" or "linked", thereby enabling significant port expansion capability. Once data packets have been received by SOC 10, sliced into cells, and placed on CPS channel 80, stacked SOC modules can interface with the CPS channel and monitor the channel, and extract appropriate information as necessary. As will be discussed below, a significant amount of concurrent lookups and filtering occurs as the packet comes in to ingress submodule 14 of an EPIC 20 or GPIC 30, with respect to layer two and layer three lookups, and fast filtering, according to the present invention.

Table management may also be achieved through the use of the CPU 52. CPU 52, via the CMIC 40, can provide the SOC 10 with software functions which result in the designation of the identification of a user at a given port 24. As discussed above, it is undesirable for the CPU 52 to access the packet information in its entirety since this would lead to performance degradation. Rather, the SOC 10 is programmed by the CPU 52 with identification information concerning the user. The SOC 10 can maintain real-time data flow since the table data communication between the CPU 52 and the SOC 10 occurs exclusively on the S channel 83. While the SOC 10 can provide the CPU 52 with direct packet information via the C channel 81, such a system setup is undesirable for the reasons set forth above. As stated above, as an ingress function an address resolution lookup is performed by examining the ARL table 21a. If the packet is addressed to one of the layer three (L3) switches of the SOC 10, then the ingress sub-module 14a performs the L3 and default table lookup. Once the destination port has been determined, the EPIC 20a sets a ready flag in the dispatch unit 18a which then arbitrates for C channel 81.

The C channel 81 arbitration scheme, as discussed previously, may be a Demand Priority Round-Robin. Each I/O module, EPIC 20, GPIC 30, and CMIC 40, along with the PMMU 70, can initiate a request for C channel access. If no requests exist at any one given time, a default module established with a high priority gets complete access to the C channel 81. If any one single I/O module or the PMMU 70 requests C channel 81 access, that single module gains access to the C channel 81 on-demand.

If EPIC modules 20a, 20b, 20c, and GPIC modules 30a and 30b, and CMIC 40 simultaneously request C channel access, then access may be granted in round-robin fashion. For a given arbitration time period each of the I/O modules would be provided access to the C channel 81. For example, each GPIC module 30a and 30b would be granted access, followed by the EPIC modules, and finally the CMIC 40. After every arbitration time period the next I/O module with a valid request would be given access to the C channel 81. This pattern would continue as long as each of the I/O modules provide an active C channel 81 access request.

If all the I/O modules, including the PMMU 70, request C channel 81 access, the PMMU 70 is granted access as shown in FIG. 4B since the PMMU provides a critical data path for all modules on the switch. Upon gaining access to the channel 81, the dispatch unit 18a proceeds in passing the received packet 112, one cell at a time, to C channel 81.

Referring again to FIG. 3, the individual C, P, and S channels of the CPS channel 80 are shown. Once the dispatch unit 18a has been given permission to access the CPS channel 80, during the first time period Cn0, the dispatch unit 18a places the first 16 bytes of the first cell 112a of the received packet 112 on the C channel 81. Concurrently, the dispatch unit 18a places the first P channel message corresponding to the currently transmitted cell. As stated above, the first P channel message defines, among other things, the message type. Therefore, this example is such that the first P channel message would define the current cell as being a unicast type message to be directed to the destination egress port 21c.

During the second clock cycle Cn1, the second 16 bytes (16:31) of the currently transmitted data cell 112a are placed on the C channel 81. Likewise, during the second clock cycle Cn1, the Bc/Mc Port Bitmap is placed on the P channel 82.

As indicated by the hatching of the S channel 83 data during the time periods Cn0 to Cn3 in FIG. 3, the operation of the S channel 83 is decoupled from the operation of the C channel 81 and the P channel 82. For example, the CPU 52, via the CMIC 40, can pass system level messages to non-active modules while an active module passes cells on the C channel 81. As previously stated, this is an important aspect of the SOC 10 since the S channel operation allows parallel task processing, permitting the transmission of cell data on the C channel 81 in real-time. Once the first cell 112a of the incoming packet 112 is placed on the CPS channel 80 the PMMU 70 determines whether the cell is to be transmitted to an egress port 21 local to the SOC 10.

If the PMMU 70 determines that the current cell 112a on the C channel 81 is destined for an egress port of the SOC 10, the PMMU 70 takes control of the cell data flow.

Figure 6:
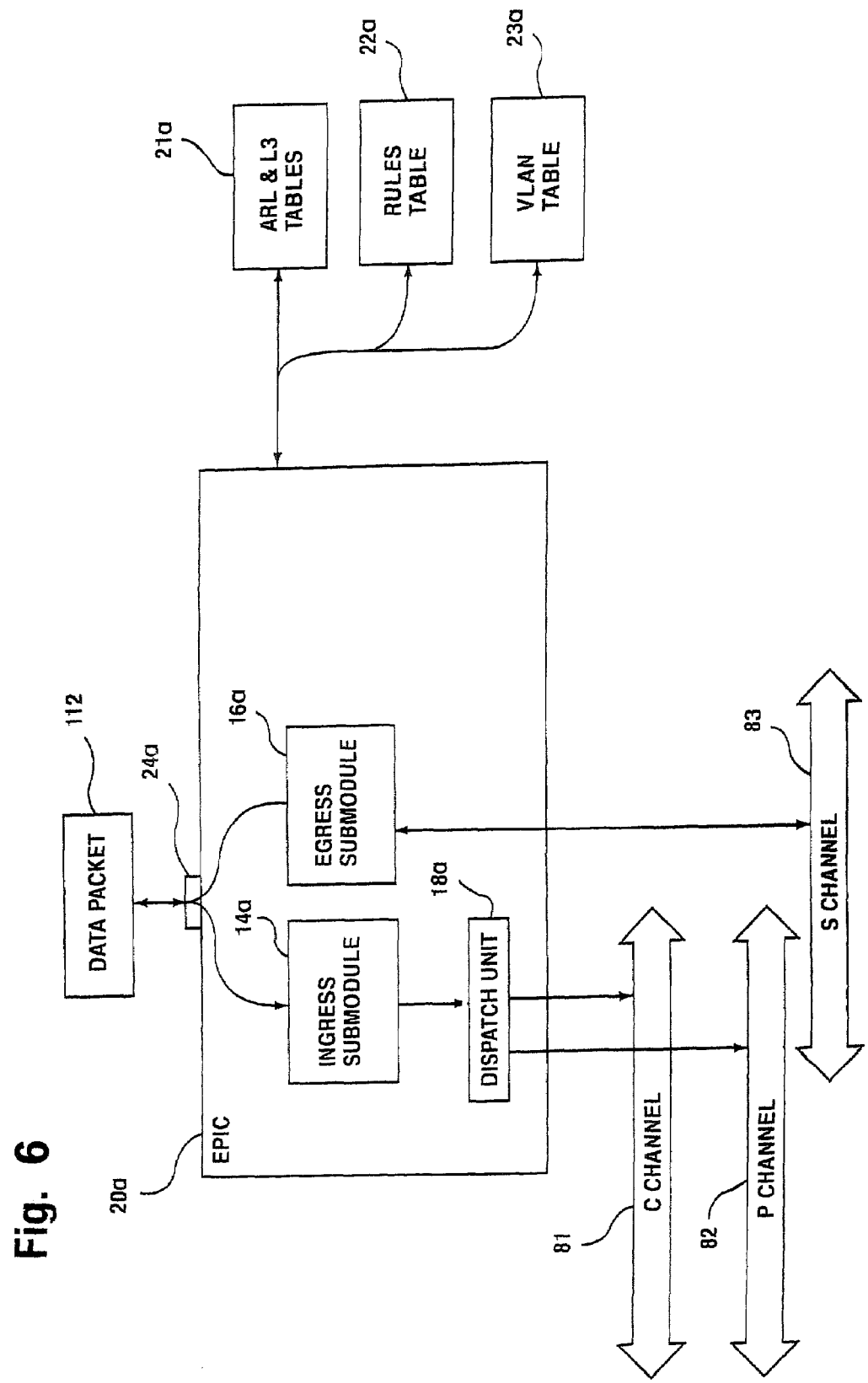
FIG. 6 is a detailed view of elements of the PMMU of a switch according to an embodiment of the present invention.

FIG. 6 illustrates, in more detail, the functional egress aspects of PMMU 70. PMMU 70 includes CBM 71, and interfaces between the GBP, CBP and a plurality of egress managers (EgM) 76 of egress submodule 18, with one egress manager 76 being provided for each egress port. CBM 71 is connected to each egress manager 76, in a parallel configuration, via R channel data bus 77. R channel data bus 77 is a 32-bit wide bus used by CBM 71 and egress managers 76 in the transmission of memory pointers and system messages. Each egress manager 76 is also connected to CPS channel 80, for the transfer of data cells 112a and 112b.

Figure 7:
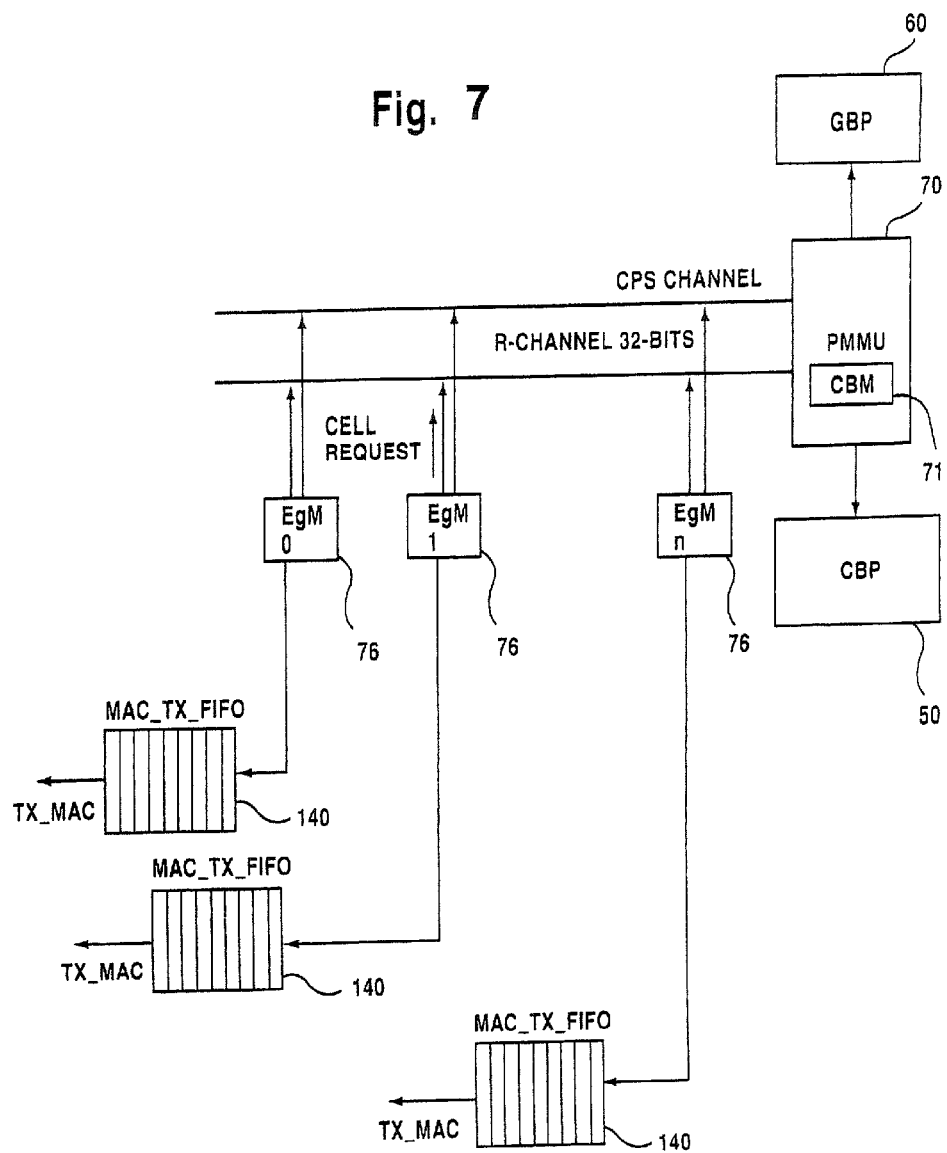
FIG. 7 illustrates the CBM cell format according to an embodiment of the present invention.

CBM 71, in summary, performs the functions of on-chip FAP (free address pool) management, transfer of cells to CBP 50, packet assembly and notification to the respective egress managers, rerouting of packets to GBP 60 via a global buffer manager, as well as handling packet flow from the GBP 60 to CBP 50. Memory clean up, memory budget management, channel interface, and cell pointer assignment are also functions of CBM 71. With respect to the free address pool, CBM 71 manages the free address pool and assigns free cell pointers to incoming cells. The free address pool is also written back by CBM 71, such that the released cell pointers from various egress managers 76 are appropriately cleared. Assuming that there is enough space available in CBP 50, and enough free address pointers available, CBM 71 maintains at least two cell pointers per egress manager 76 which is being managed. The first cell of a packet arrives at an egress manager 76, and CBM 71 writes this cell to the CBM memory allocation at the address pointed to by the first pointer. In the next cell header field, the second pointer is written. The format of the cell as stored in CBP 50 is shown in FIG. 7; each line is 18 bytes wide. Line 0 contains appropriate information with respect to first cell and last cell information, broadcast/multicast, number of egress ports for broadcast or multicast, cell length regarding the number of valid bytes in the cell, the next cell pointer, total cell count in the packet, and time stamp. The remaining lines contain cell data as 64 byte cells. The free address pool within PMMU 70 stores all free pointers for CBP 50. Each pointer in the free address pool points to a 64-byte cell in CBP 50; the actual cell stored in the CBP is a total of 72 bytes, with 64 bytes being byte data, and 8 bytes of control information. Functions such as HOL blocking high and low watermarks, out queue budget registers, CPID assignment, and other functions are handled in CBM 71 within the PMMU 70.

When PMMU 70 determines, e.g., by a table look-up (i.e., a search described further below), that cell 112a is destined for an appropriate egress port on SOC 10, PMMU 70 controls the cell flow from CPS channel 80 to CBP 50. As the data packet 112 is received at PMMU 70 from CPS 80, CBM 71 determines whether or not sufficient memory is available in CBP 50 for the data packet 112. A free address pool (not shown) can provide storage for at least two cell pointers per egress manager 76, per class of service. If sufficient memory is available in CBP 50 for storage and identification of the incoming data packet, CBM 71 places the data cell information on CPS channel 80. The data cell information is provided by CBM 71 to CBP 50 at the assigned address. As new cells are received by PMMU 70, CBM 71 assigns cell pointers. The initial pointer for the first cell 112a points to the egress manager 76 which corresponds to the egress port to which the data packet 112 will be sent after it is placed in memory. In the example of FIGS. 6, packets come in to port 24a of EPIC 20a, and are destined for port 24c of EPIC 20c. For each additional cell 112b, CBM 71 assigns a corresponding pointer. This corresponding cell pointer is stored as a two byte or 16 bit value NC_header, in an appropriate place on a control message, with the initial pointer to the corresponding egress manager 76, and successive cell pointers as part of each cell header, a linked list of memory pointers is formed which defines packet 112 when the packet is transmitted via the appropriate egress port, in this case 24c. Once the packet is fully written into CBP 50, a corresponding CBP Packet Identifier (CPID) is provided to the appropriate egress manager 76; this CPID points to the memory location of initial cell 112a. The CPID for the data packet is then used when the data packet 112 is sent to the destination egress port 24c. In actuality, the CBM 71 maintains two buffers containing a CBP cell pointer, with admission to the CBP being based upon a number of factors.

Since CBM 71 controls data flow within SOC 10, the data flow associated with any ingress port can likewise be controlled. When packet 112 has been received and stored in CBP 50, a CPID is provided to the associated egress manager 76. The total number of data cells associated with the data packet is stored in a budget register (not shown). As more data packets 112 are received and designated to be sent to the same egress manager 76, the value of the budget register corresponding to the associated egress manager 76 is incremented by the number of data cells 112a, 112b of the new data cells received. The budget register therefore dynamically represents the total number of cells designated to be sent by any specific egress port on an EPIC 20. CBM 71 controls the inflow of additional data packets by comparing the budget register to a high watermark register value or a low watermark register value, for the same egress.

FIG. 8 illustrates some of the concurrent filtering and look-up details of a packet coming into the ingress side of an EPIC 20 according to the present invention. FIG. 8 addresses the application of filtering, address resolution, and rules application segments of SOC 10. These functions are performed simultaneously with respect to the CBP admission. Packet 112 is received at input port 24 of EPIC 20. It is then directed to input FIFO 142. As soon as the first sixteen bytes of the packet arrive in the input FIFO 142, the address resolution logic performs a lookup in the ARL/L3 tables 21. The address resolution logic may include an ARL engine 143 which receives an address resolution request in order to initiate a lookup in ARL/L3 tables 21.

A description of the fields that may be contained in an ARL table of ARL/L3 tables 21 is as follows:

Mac Address—48 bits long—Mac Address, an address used for switching, learning and other network functions address;

VLAN tag—12 bits long—VLAN Tag Identifier as described in IEEE 802.1q standard for tagged packets. For an untagged Packet, this value is picked up from Port Based VLAN Table.

CosDst—3 bits long—Class of Service based on the Destination Address. COS identifies the priority of this packet. 8 levels of priorities as described in IEEE 802.1p standard.

Port Number—6 bits long—Port Number is the port on which this Mac address is learned.

SD_Disc Bits—2 bits long—These bits identifies whether the packet should be discarded based on Source Address or Destination Address. Value 1 means discard on source. Value 2 means discard on destination.

C bit—1 bit long—C Bit identifies that the packet should be given to CPU Port.

St Bit—1 bit long—St Bit identifies that this is a static entry (it is not learned Dynamically) and that means is should not be aged out. Only CPU 52 can delete this entry.

Ht Bit—1 bit long—Hit Bit—This bit is set every time there is match with the Source Address. It is used in the aging Mechanism.

CosSrc—3 bits long—Class of Service based on the Source Address. COS identifies the priority of this packet.

L3 Bit—1 bit long—L3 Bit—identifies that this entry is created as result of L3 Interface Configuration. The Mac address in this entry is L3 interface Mac Address and that any Packet addresses to this Mac Address need to be routed.

T Bit—1 bit long—T Bit identifies that this Mac address is learned from one of the Trunk Ports. If there is a match on Destination address then output port is not decided on the Port Number in this entry, but is decided by the Trunk Identification Process based on the rules identified by the RTAG bits and the Trunk group Identified by the TGID.

TGID—3 bits long—TGID identifies the Trunk Group if the T Bit is set. SOC 10 supports 6 Trunk Groups per switch.

RTAG—3 bits long—RTAG identifies the Trunk selection criterion if the destination address matches this entry and the T bit is set in that entry. Value 1—based on Source Mac Address. Value 2—based on Destination Mac Address. Value 3—based on Source & destination Address. Value 4—based on Source IP Address. Value 5—based on Destination IP Address. Value 6—based on Source and Destination IP Address.

S C P—1 bit long—Source CoS Priority Bit—If this bit is set (in the matched Source Mac Entry) then Source CoS has priority over Destination Cos.

It should also be noted that VLAN tables 23 may include a number of table formats; all of the tables and table formats will not be discussed herein. However, as an example, the port based VLAN table fields are described as follows:

Port VLAN Id—12 bits long—Port VLAN Identifier is the VLAN Id used by Port Based VLAN.

Sp State—2 bits long—This field identifies the current Spanning Tree State. Value 0x00—Port is in Disable State. No packets are accepted in this state, not even BPDUs. Value/0x01—Port is in Blocking or Listening State. In this state no packets are accepted by the port, except BPDUs. Value 0x02—Port is in Learning State. In this state the packets are not forwarded to another Port but are accepted for learning. Value 0x03—Port is in Forwarding State. In this state the packets are accepted both for learning and forwarding.

Port Discard Bits—6 bits long—There are 6 bits in this field and each bit identifies the criterion to discard the packets coming in this port. Note: Bits 0 to 3 are not used. Bit 4—If this bit is set then all the frames coming on this port will be discarded. Bit 5—If this bit is set then any 802.1 q Priority Tagged (vid=0) and Untagged frame coming on this port will be discarded.

J Bit—1 bit long—J Bit means Jumbo bit. If this bit is set then this port should accept Jumbo Frames.

RTAG—3 bits long—RTAG identifies the Trunk selection criterion if the destination address matches this entry and the T bit is set in that entry. Value 1—based on Source Mac Address. Value 2—based on Destination Mac Address. Value 3—based on Source & destination Address. Value 4—based on Source IP Address. Value 5—based on Destination IP Address. Value 6—based on Source and Destination IP Address.

T Bit—1 bit long—This bit identifies that the Port is a member of the Trunk Group.

C Learn Bit—1 bit long—Cpu Learn Bit—If this bit is set then the packet is sent to the CPU whenever the source Address is learned.

PT—2 bits long—Port Type identifies the port Type. Value 0—10 Mbit Port. Value 1—100 Mbit Port. Value 2—1 Gbit Port. Value 3—CPU Port.

VLAN Port Bitmap—28 bits long—VLAN Port Bitmap Identifies all the egress ports on which the packet should go out.

B Bit—1 bit long—B bit is BPDU bit. If this bit is set then the Port rejects BPDUs. This Bit is set for Trunk Ports which are not supposed to accept BPDUs.

TGID—3 bits long—TGID—this field identifies the Trunk Group which this port belongs to.

Untagged Bitmap—28 bits long—This bitmap identifies the Untagged Members of the VLAN. i.e. if the frame destined out of these members ports should be transmitted without Tag Header.

M Bits—1 bit long—M Bit is used for Mirroring Functionality. If this bit is set then mirroring on Ingress is enabled.

The ARL engine 143 reads the packet; if the packet has a VLAN tag according to IEEE Standard 802.1q, then ARL engine 143 performs a look-up based upon tagged VLAN table 231, which is part of VLAN table 23. If the packet does not contain this tag, then the ARL engine performs VLAN lookup based upon the port based VLAN table 232. Once the VLAN is identified for the incoming packet, ARL engine 143 performs an ARL table search based upon the source MAC address and the destination MAC address. This search may be a binary search. If the results of the destination search is an L3 interface MAC address, then an L3 search is performed of an L3 table within ARL/L3 tables 21. If the L3 search is successful, then the packet is modified according to packet routing rules and the ARL tables are updated according to the description above.

To better understand lookups, learning, and switching, it may be advisable to once again discuss the handling of packet 112 with respect to FIG. 6. If data packet 112 is sent from a source station A into port 24a of EPIC 20a, and destined for a destination station B on port 24c of EPIC 20c, ingress submodule 14a slices data packet 112 into cells 112a and 112b. The ingress submodule then reads the packet to determine the source MAC address and the destination MAC address. As discussed previously, ingress submodule 14a, in particular ARL engine 143, performs the lookup of appropriate tables within ARL/L3 tables 21a, and VLAN table 23a, to see if the destination MAC address exists in ARL/L/3 tables 21a; if the address is not found, but if the VLAN IDs are the same for the source and destination, then ingress submodule 14a will set the packet to be sent to all ports. The packet will then propagate to the appropriate destination address. A "source search" and a "destination search" may be binary searches and may occur in parallel. Concurrently, the source MAC address of the incoming packet can be "learned", and therefore added (inserted) to an ARL table within ARL/L3 table 21a. After the packet is received by the destination, an acknowledgement is sent by destination station B to source station A. Since the source MAC address of the incoming packet is learned by the appropriate table of B, the acknowledgement is appropriately sent to the port on which A is located. When the acknowledgement is received at port 24a, therefore, the ARL table learns the source MAC address of B from the acknowledgement packet. It should be noted that as long as the VLAN IDs (for tagged packets) of source MAC addresses and destination MAC addresses are the same, layer two switching as discussed above is performed. L2 switching and lookup is therefore based on the first 16 bytes of an incoming packet. For untagged packets, the port number field in the packet is indexed to the port-based VLAN table within VLAN table 23a, and the VLAN ID can then be determined. If the VLAN IDs are different, however, L3 switching is necessary wherein the packets are sent to a different VLAN. L3 switching, however, is based on the IP header field of the packet. The IP header includes source IP address, destination IP address, and TTL (time-to-live).

In order to more clearly understand layer three switching, data packet 112 is sent from source station A onto port 24a of EPIC 20a, and is directed to destination station B; assume, however, that station B is disposed on a different VLAN, as evidenced by the source MAC address and the destination MAC address having differing VLAN IDs. The lookup for B would be unsuccessful since B is located on a different VLAN, and merely sending the packet to all ports on the VLAN would result in B never receiving the packet. Layer three switching, therefore, enables the bridging of VLAN boundaries, but requires reading of more packet information than just the MAC addresses of L2 switching. In addition to reading the source and destination MAC addresses, therefore, ingress 14a also reads the IP address of the source and destination. As noted previously, packet types are defined by IEEE and other standards, and are known in the art. By reading the IP address of the destination, SOC 10 is able to target the packet to an appropriate router interface which is consistent with the destination IP address. Packet 112 may therefore be sent on to CPS channel 80 through dispatch unit 18a, destined for an appropriate router interface (not shown, and not part of SOC 10), upon which destination B is located. Control frames, identified as such by their destination address, are sent to CPU 52 via CMIC 40. The destination MAC address, therefore, is the router MAC address for B. The router MAC address may be learned through hardware or with the assistance of CPU 52, which uses an ARP (address resolution protocol) request to request the destination MAC address for the router for B, based upon the IP address of B. Through the use of the IP address, therefore, SOC 10 can learn the destination MAC address. Through the acknowledgement and learning process, however, if the CPU 52 is used for learning, only the first packet is subject to "slow" handling because of the involvement of CPU 52. After the appropriate MAC addresses are learned, linespeed switching can occur through the use of concurrent table lookups since the necessary information will be learned by the tables. Implementing the tables in silicon as two-dimensional arrays enables such rapid concurrent lookups. Once the MAC address for B has been learned, therefore, when packets come in with the IP address for B, ingress 14a changes the IP address to the destination MAC address, in order to enable linespeed switching. Also, the source address of the incoming packet is changed to the router MAC address for A rather than the IP address for A, so that the acknowledgement from B to A can be handled in a fast manner without needing to utilize a CPU on the destination end in order to identify the source MAC address to be the destination for the acknowledgement. Additionally, a TTL (time-to-live) field in the packet is appropriately manipulated in accordance with the IETF (Internet Engineering Task Force) standard. A unique aspect of SOC 10 is that all of the switching, packet processing, and table lookups are performed in hardware, rather than requiring CPU 52 or another CPU to spend time processing instructions. It should be noted that the layer three tables for EPIC 20 can have varying sizes.

Referring again to the discussion of FIG. 8, as soon as the first sixty four bytes of the packet arrive in input FIFO 142, a filtering request is sent to FFP 141. FFP 141 is an extensive filtering mechanism which enables SOC 10 to set inclusive and exclusive filters on any field of a packet from layer 2 to layer 7 of the OSI seven layer model. Filters are used for packet classification based upon a protocol fields in the packets. Various actions may be performed based upon the packet classification, including packet discard, sending of the packet to the CPU, sending of the packet to other ports, sending the packet on certain COS priority queues, changing the type of service (TOS) precedence.

An exclusive filter is primarily used for implementing security features, and allows a packet to proceed only if there is a filter match. If there is no match, the packet is discarded.

It should be noted that SOC 10 has a unique capability to handle both tagged and untagged packets coming in. Tagged packets are tagged in accordance with IEEE standards, and include a specific IEEE 802.1p priority field for the packet. Untagged packets, however, do not include an 802.1p priority field therein. SOC 10 can assign an appropriate COS value for the packet, which can be considered to be equivalent to a weighted priority, based either upon the destination address or the source address of the packet, as matched in one of the table lookups. As noted in the ARL table format discussed herein, an SCP (Source COS Priority) bit is contained as one of the fields of the table. When this SCP bit is set, then SOC 10 can assign weighted priority based upon a source COS value in the ARL table. If the SCP is not set, then SOC 10 will assign a COS for the packet based upon the destination COS field in the ARL table. These COS of values are three bit fields in the ARL table, as noted previously in the ARL table field descriptions.

FFP 141 is essentially a state machine driven programmable rules engine. The filters used by the FFP may be, for example, 64 (sixty-four) bytes wide, and are applied on an incoming packet; any offset can be used, however, a preferred embodiment uses an offset of zero, and therefore operates on the first 64 bytes, or 512 bits, of a packet. The actions taken by the filter may include tag insertion, priority mapping, TOS tag insertion, sending of the packet to the CPU, dropping of the packet, forwarding of the packet to an egress port, and sending the packet to a mirrored port. The filters utilized by FFP 141 are defined by rules table 22. Rules table 22 imay be programmable by CPU 52, through CMIC 40. The rules table can be, for example, 256 entries deep, and may be partitioned for inclusive and exclusive filters, with, again as an example, 128 entries for inclusive filters and 128 entries for exclusive filters.

It should also be noted that the block diagram of SOC 10 in FIG. 2 illustrates each GPIC 30 having its own ARL/L3 tables 31, rules table 32, and VLAN tables 33, and also each EPIC 20 also having its own ARL/L3 tables 21, rules table 22, and VLAN tables 23. In a preferred embodiment of the invention, however, two separate modules can share a common ARL/L3 table and a common VLAN table. Each module, however, may have its own rules table 22. For example, therefore, GPIC 30a may share ARL/L3 table 21a and VLAN table 23a with EPIC 20a. Similarly, GPIC 30b may share ARL table 21b and VLAN table 23b with EPIC 20b. This sharing of tables reduces the number of gates which are required to implement the invention, and makes for simplified lookup and synchronization as will be discussed below.

Figure 9:
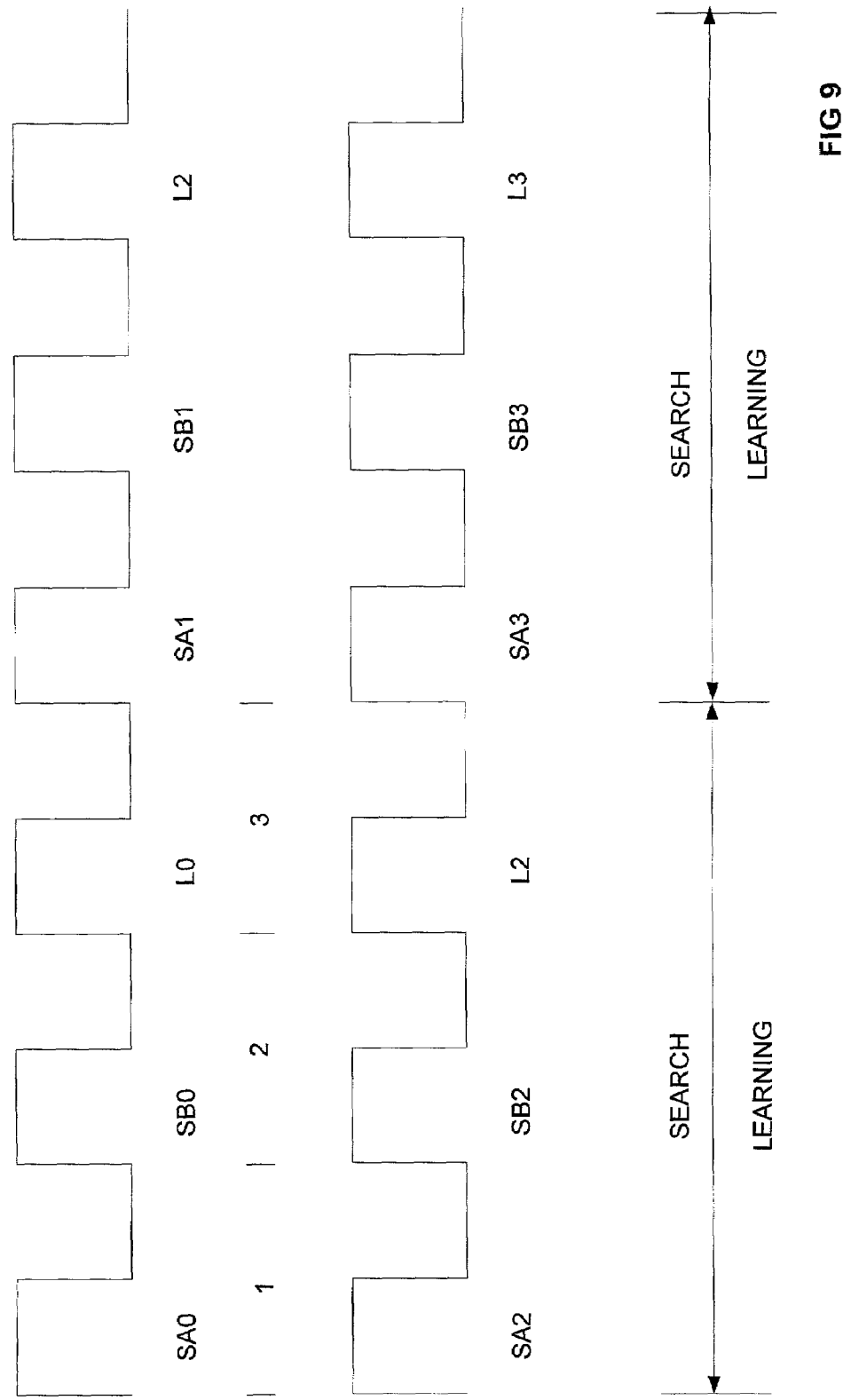
FIG. 9 illustrates slot based concurrent searching and learning with reference to a timing signal according to the present invention.

In support of high-speed switching, the present invention includes improved systems and methods for performing searching and learning concurrently. Table searching typically has priority over learning. However, to optimize switching performance, it is desired to guarantee some bandwidth to learning. Thus, according to the present invention, table access may be delegated in a slotted fashion. For example, referring to FIG. 9, a timing signal (e.g., a clock signal, square wave, etc.) may be slotted into three slots. Each slot may be dedicated to searching or learning. For example, access to Rules table 22 may be limited based on slots of the timing signal. SA0 and SB0 represent the first steps of two binary searches SA and SB. L0 represents a learning step, such as an update or insert, as described above. Each three slots represents a single cycle. As shown, each complete cycle is a learning and searching cycle. Thus, a portion (slot) of every cycle is dedicated to performing searching functions and a portion of every cycle is dedicated to learning functions.

However, allowing learning to occur while searches are being performed causes some problems that need to be addressed (i.e., problems caused by shared table access). In order to better understand the relationship between learning and searching, a brief discussion of binary searching according to the present invention is provided next.

Figure 10:
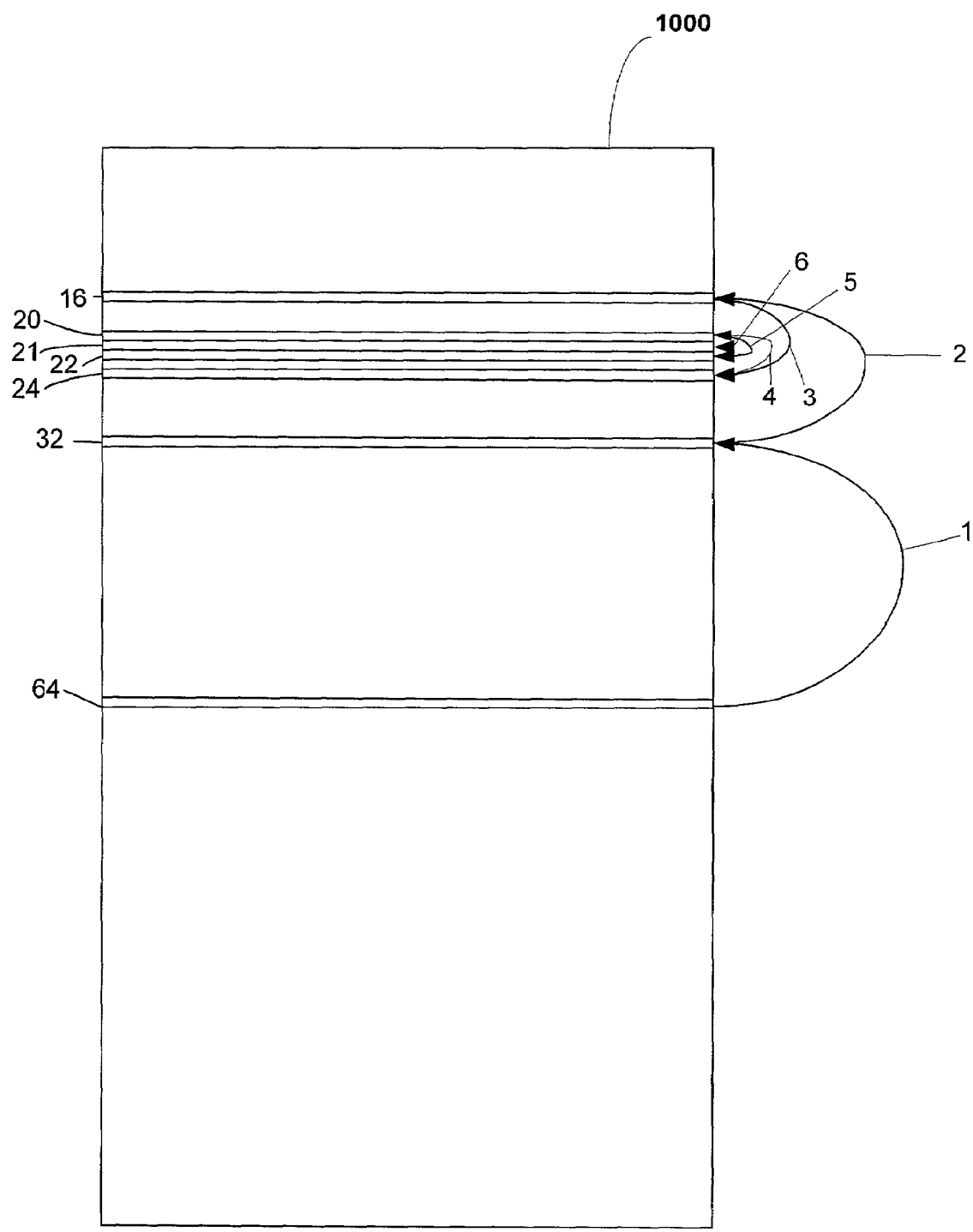
FIG. 10 is a diagram of binary search of an on-chip table according to the present invention.

Referring to FIG. 10, shown is an exemplary table 1100 to be searched, which could be any of the on-chip tables already described above. Assuming that table 1000 is sorted in an order and indexed or keyed, a binary search is extremely efficient. Binary search steps are illustrated by curved arrows. First, a search begins in the center of a memory bank (unless it's indexed). As an example, the table has 128 rows or memory units (word lines, etc.). Therefore, the search begins at row 64. The search engine or facility controlling the search, such as the FFP 141, PMMU 70 or CBM 71, or ARL logic compares the value stored in row 64 against the search criteria. If the value is greater than or less than the search criteria, then the search jumps up or down, respectively, a number of rows equal to $2^{(m-n)}$, where m is logarithm of the number of rows in the table, and n is the number of the current search step. For example, in a 128 row table, step 1 begins at row $64=2^{(m-n)}=2^{7-1}=2^6$. At step 2, the next jump is plus or minus $2^5=32$, therefore, the search jumps down to 32 or up to 96 depending on the result of the comparison.

The search continues jumping until a match is found, that is, until the value not higher or low than the search criteria. As an example, if the match is in a row 21, the process steps from 64 to 32 at step 1, because 21 is less than 64. Next, at step 2, the search jumps from 32 to 16. Since 21 is greater than 16, the search then jumps from 16 to 20, then from 20 to 22, and finally from 22 to back to 21, at step 6. Note the search takes a total of six steps. Considering that the memory bank contains 128 rows, which could require a full scan of 128 steps to find a match, a binary search is much more efficient.

As described above, the ARL/L3 table includes a hit-bit for aging purposes. As matches are made during table look-ups, the appropriate hit-bits in the ARL tables are updated for aging purposes (hit-bit updates may be performed as part of the search function and during search slots). Therefore, several potential problems may occurs when performing learning functions and searching functions concurrently against the same tables. For example, as will be described below, learning updates can move data records, thereby disrupting the search process including hit-bit updates. As a result, hit-bit updates may be incorrect or fail, or learning may cause blind spots in searches. Special handling is required to overcome these problems.

The first problem that can occur while trying to perform searching and learning concurrently are caused by inserting a record into the ARL table while concurrently trying to update a record in the ARL table. For example, when a match is made in a search, such as a table lookup for an incoming packet, the hit-bit of the matching record is updated for aging purposes. However, if during the same cycle a new address is learned, and therefore a new record is inserted into the ARL table, which could in turn move the record being updated, the hit-bit update may occur against the wrong row or data record. In order to prevent this from occurring, learning functions can be blocked for the cycle after a match is made for a search, so that the hit-bit update may occur at the exact same record the match occurred.

Figure 11:
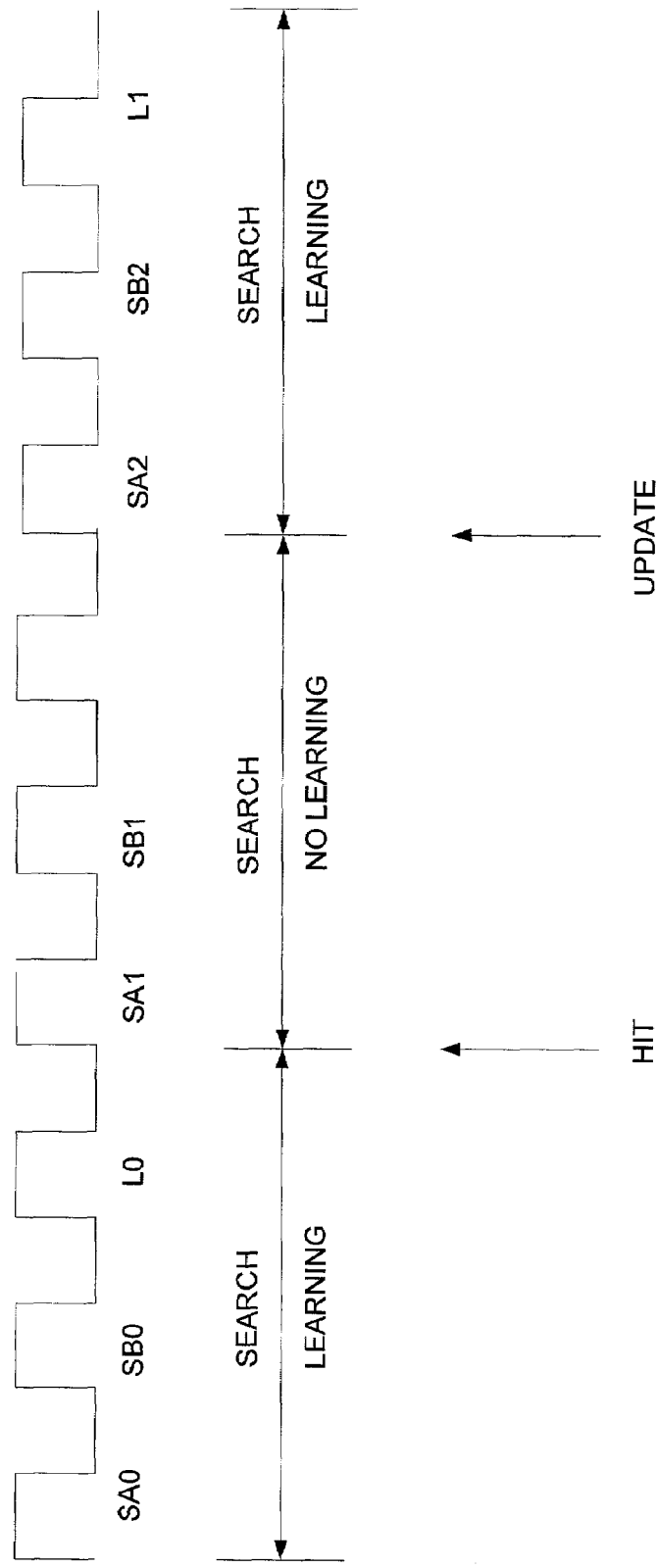
FIG. 11 illustrates slot based concurrent searching and learning with reference to a timing signal according to the present invention.

As an example, referring to FIG. 11, during the first cycle of a search, there may be a hit on search SA0 or SB0. Therefore, during the second cycle a hit-bit update to the ARL table will be performed. During the second cycle there is no learning activity because learning is blocked in order to prevent an insertion into the ARL table from affecting the hit-bit update. After the update in the third cycle, learning may be resumed.

It should be noted that learning can be blocked until the hit-bit update is finished, or if other updates are performed on a match, until all updates related to the search are finished. ARL logic or other switch logic may be used to "snoop" (monitor) learning and hit-bit updates in order to block or prioritize the functions according to the present invention. Internal switch logic is preferred over the use CPU 52, because the use of the CPU 52 to perform functions related to network performance will considerably decrease the over all performance. Furthermore, the ARL logic may be configured to control reads and writes to the various tables in order to perform blocking and prioritizing functions in accordance with the present invention.

Figure 12:
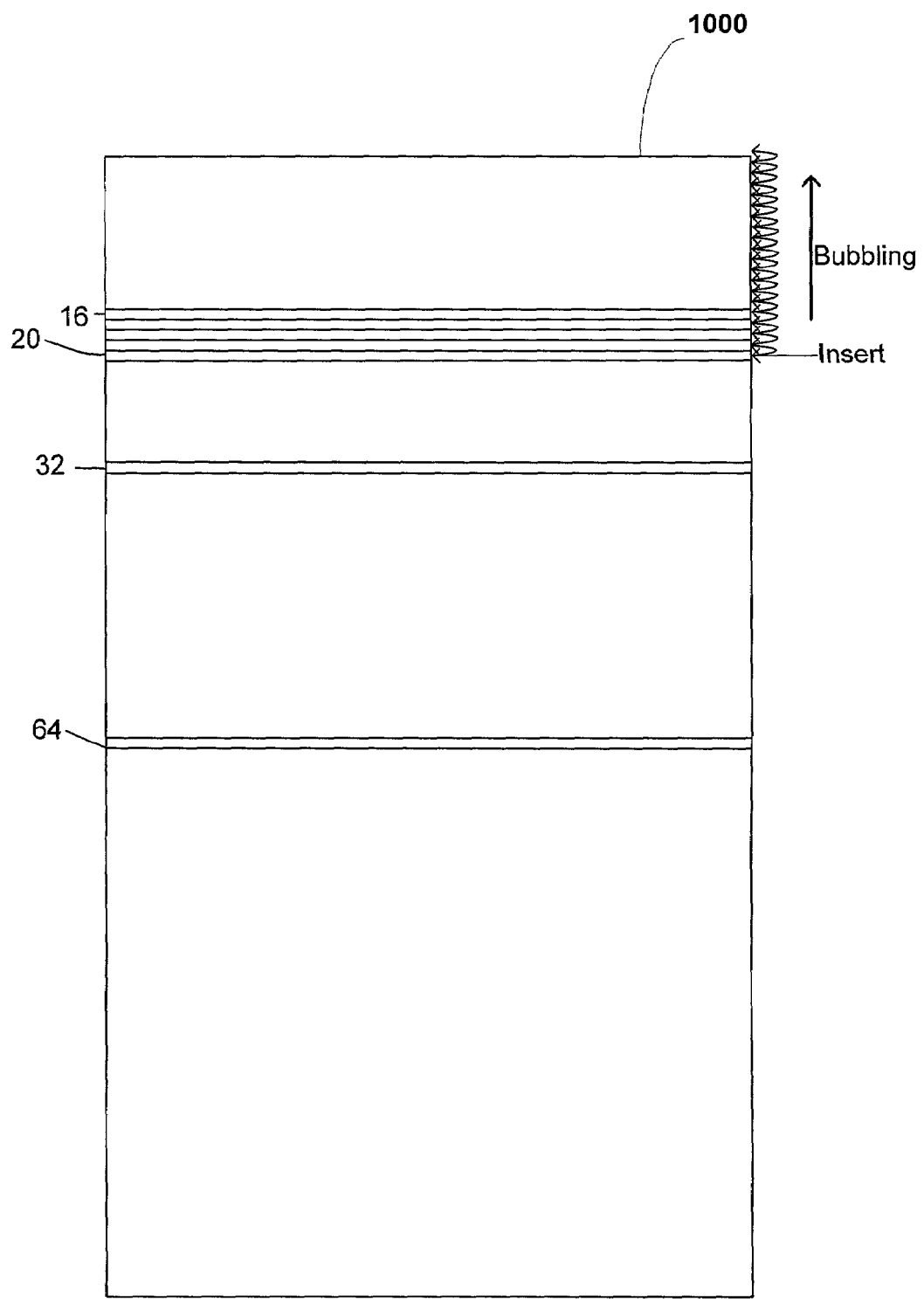
FIG. 12 is a diagram of a bubble sort according to the present invention.

A second problem caused by concurrently performing learning and searching is caused by bubble sorting a table after an insert have upon a search in progress. A brief description of a bubble sort is described with reference to FIG. 12.

As described above, searching may be performed via binary searches, which require that the tables being searched to be in a sorted order prior to the search (or to pre-sort the table prior to the search). Therefore, new records being inserted into a table must be inserted into the correct, sorted location. All the records must be shifted up or down to accommadate the new record and maintain the sorted table. This is commonly accomplished via a bubble sort or "bubbling."

For example, during the learning process, a new record is inserted in the table 1000, such as when a new address has been found attached to SOC 10, then a bubble sort is performed in order to cascade update every row in order to keep the table 1000 sorted. If a new address is to be inserted to row 20 of table 1000, row 20 is read out and inserted into row 19. Additionally, row 19 is read out and inserted into row 18, and so on. From a practical standpoint, in order to successfully perform the bubble sort, the sort will begin at the top of the table and bubble down to the new insert. Accordingly, row 2 is read out and written into row 1, and row 3 is read out and written into row 2, and so forth up to row 20. After row 20 is read out and written into row 19, then the new record is inserted into row 20. One having ordinary skill in the art will readily understand a bubble sort and will recognize that many forms of the bubble sort may be used with the present invention. As the records are moved up the table, this is often referred to as "bubbling" or "bubbling up".

The following is an example of how bubbling affects searching and learning according to the present invention. Referring back to FIG. 10, during a binary search, the search jumps a number of rows up or down the table depending on the current step. One having ordinary skill in the art will understand that a bubble sort will "bubble" records up or down after an insert into the table, from or to the point of the insertion. Therefore, if a bubble sort is occurring concurrently with a search against the same table, blind spots can be caused. For example, assume that during step 1 the determination is made that a record to be found is lower than row 64, and the search jumps from 64 to 32. Next, at step 2, it is determined that the record to be found is higher than row 32 and therefore the search jumps to row 16. However, if the record to be found was at row 17 during the cycle wherein the search determined where to jump next for step 3, but then is bubbled to row 16, then the search will never be able to find the record. This is because a binary search is unable to mathematically return to a row that is already checked. In the example just given, the search would attempt to jump from row 16 to row 24, then again downward to row 28, then downward to row 30, and then finish at row 31 never actually returning to row 32. Therefore, concurrently bubble sorting a table while a binary search is being performed can cause blind spots and cause a search to fail.

In order to prevent the search from failing, precautions can be taken. One way to prevent the bubbling from interfering with a binary search, is to snoop bubble writes. ARL logic can be configured to snoop search hits and updates to the ARL table. Snoop hits (reads) can be given a higher priority over regular binary search hits. In other words, if a search hit and a bubble sort hit occurs on the same record at the same time, then the data related to the bubble sort hit can be used by the ARL logic for both function, because that data is going to be correct (i.e., because the data is about to move). If the regular search hit results are used, then other logic in the switch receiving the data could be affected since the data is about to move via a bubble write. The blind spots of a search are only one cycle away for each search step. Therefore, updates need only be snooped one step away for a given search. For example, if the next step is going to row 32, only rows 31, 32, and 33 will need to be snooped.

As described above, during a bubble sort, learning performs a reads and writes on alternating cycles until the table is properly sorted after an insert. As described above, when a write is going into a location that the search request is trying to hit, the write is blocked. To block the write, the write can be simply changed into a read, and the write can be performed in the next cycle. Accordingly, the ARL logic of SOC 10 may be configured to perform snooping and blocking as described herein.

Figure 13:
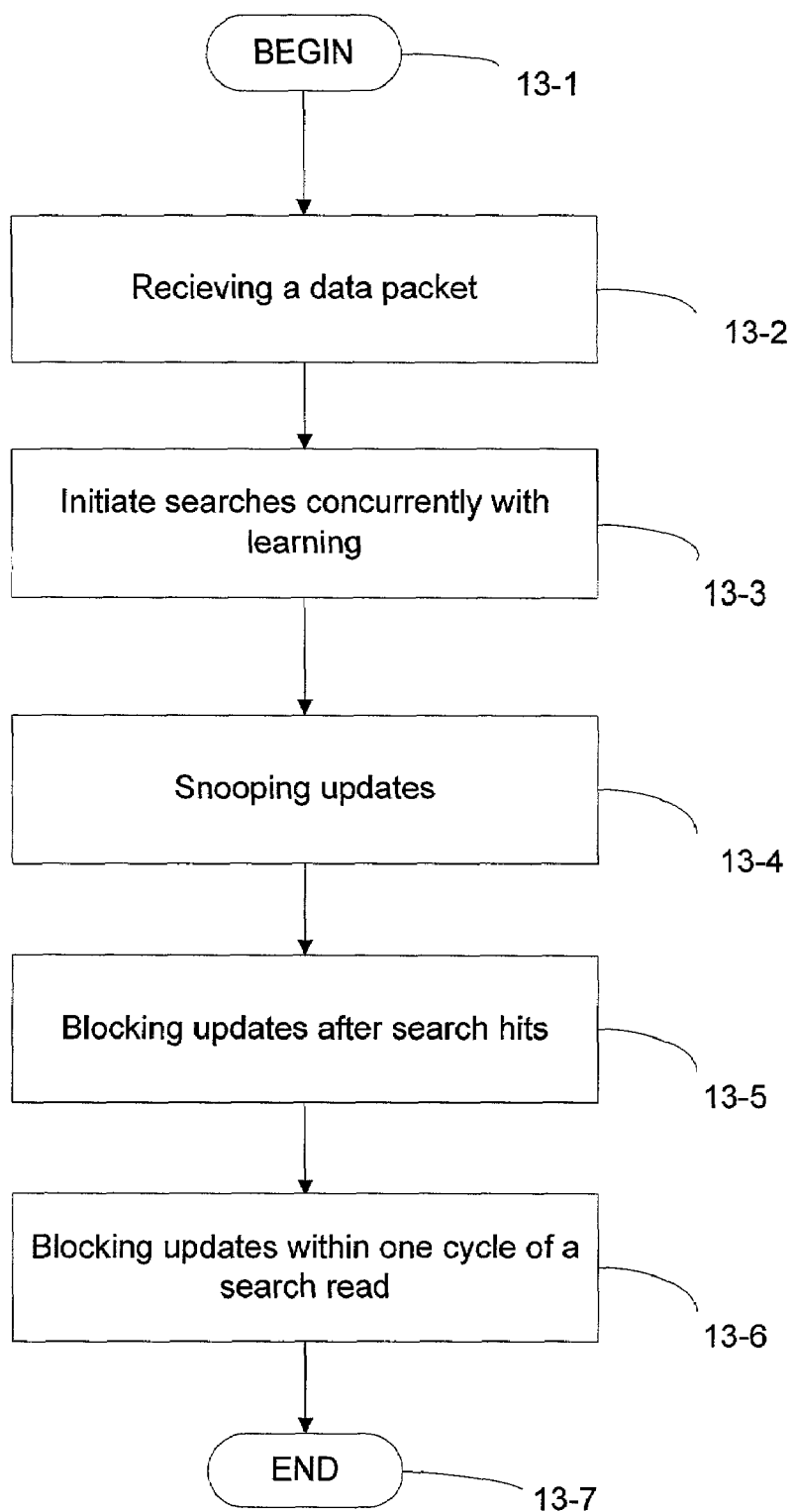
FIG. 13 is a flow chart of a method for performing concurrent learning and searching within a network device according to the present invention.

Referring to FIG. 13, a flow chart is shown of a method for performing searching and learning concurrently within a network device, such as a switch. In processing begins at step S13-1 and proceeds next to step S13 in a network device. In a network device, such as the switch SOC 10 described above with reference to FIGS. 1–8, a data packet is received at a network port. As described above, the data packet must be handled. At step S13-3, a number of searches may be initiated against ARL tables in order to determine a location. As data packets are received and switched to network devices, switch SOC 10 is configured to also perform learning. As already described above, searching and learning can be concurrently performed by dedicating slots of a timing signal to each function. For example, every third square wave of a timing signal may be dedicated to learning while two out of every three waves may be dedicated to parallel searching. In this case, a complete cycle would comprise three slots, two of which are dedicated to searching and one of which is dedicated to learning.

At step S13-4, updates are snooped. As described above, the ARL logic or other logic within the switch can be configured to snoop updates against the table including hit-bit updates and bubble sort updates. At step S13-5, updates can be blocked after a search returns a match. As already described above, once a search makes a match (i.e., finds a destination address for a data packet), then during the next cycle the hit-bit for the match will be updated. Accordingly, learning is blocked in the cycle after a match is made in order to prevent the hit-bit update from failing.

Next, at step S13-6, updates are blocked if they are to rows which are within one search cycle for any presently occurring search. For example, as already described above, a binary search will jump up and down the table, and bubbling can cause blind spots if the record is moved at the border during the next search cycle. Therefore, updates are snooped and when it is determined that a row within one search cycle (i.e., the next jump) is to occur, the update is blocked for one cycle. And processing ends at step S13-7.

One having ordinary skill in the art will readily understand that the preceding system and method for performing a keyed binary search according to the present invention may be applicable to many on-chip search processes. Accordingly, the present invention is not meant to be limited to the embodiments described above or network switches.

Although the invention has been described based upon these preferred embodiments, it would be apparent to those of skilled in the art that certain modifications, variations, and alternative constructions would be apparent, while remaining within the spirit and scope of the invention. In order to determine the metes and bounds of the invention, therefore, reference should be made to the appended claims.

What is claimed is:

1. A network device comprising:
   at least one network port;
   a clock generating a timing signal;
   address resolution logic (ARL) tables configured to store and maintain network address data; and
   address resolution logic coupled to said ARL tables and said clock, and configured to search said ARL tables and to perform updates and inserts to said ARL tables based on a learning function, said searching and said updates and inserts being performed concurrently during alternating slots of said timing signal;

wherein said address resolution logic is configured to search said ARL tables for a destination address based on a data packet received at a port of said at least one port, and when said search returns a destination address, said address resolution logic is configured to update a related record of said ARL tables based on said learning function.

2. The network device of claim 1, wherein said address resolution logic is configured to perform multiple searches of said ARL tables and to perform said updates and inserts concurrently during alternating slots of said timing signal, and to perform said updates and inserts based at least one result of said multiple searches.

3. The network device of claim 1, wherein said address resolution logic is configured to utilize a data read related to learning updates for searches, when a search and an update attempt to read a same record in a same cycle.

4. The network device of claim 1, wherein said network device is configured to block updates and inserts associated with said learning function for one search cycle of said timing signal when a search finds a destination address.

5. The network device of claim 1, wherein said address resolution logic is configured to insert records into said ARL table based on said learning function, to perform a bubble sort when inserting a record into said ARL tables, to snoop updates caused by said bubble sort, and to block any updates to records within one search step of a search being executed.

6. The network device of claim 5, wherein said searches are binary searches.

7. The network device of claim 5, wherein said address resolution logic is configured to block updates caused by said bubble sort for one search cycle of said timing signal when a search finds a destination address.

8. The network device of claim 7, wherein said address resolution logic is configured to block updates by changing a data write associated with an update being blocked to a data read for one cycle of said timing signal.

9. The network device of claim 1, wherein said address resolution logic is configured to block updates by changing a data write associated with an update being blocked to a data read for one cycle of said timing signal.

10. A network device comprising:
at least one network port;
a clock means for generating a timing signal;
address resolution logic (ARL) table means for storing and maintaining network address data; and
address resolution logic means for coupling to said ARL tables and said clock, and for searching said ARL tables and perform updates and inserts to said ARL tables based on a learning function, said searching and said updates and inserts being performed concurrently during alternating slots of said timing signal;
wherein said address resolution logic means is configured to search said ARL table means for a destination address based on a data packet received at a port of said at least one port, and when said search returns a destination address, said address resolution logic means is configured to update a related record of said ARL table means based on said learning function.

11. The network device of claim 10, wherein said address resolution logic means is configured to perform multiple searches in said ARL table means and to perform said updates and inserts concurrently during alternating slots of said timing signal, and to perform said updates and inserts based at least one result of said multiple searches.

12. The network device of claim 10, wherein said address resolution logic means is configured to utilize a data read related to learning updates for searches, when a search and an update attempt to read a same record in a same cycle.

13. The network device of claim 10, wherein said address resolution logic means is configured to block updates and inserts associated with said learning function for one search cycle of said timing signal when a search finds a destination address.

14. The network device of claim 10, wherein said address resolution logic means is configured to insert records into said ARL table mean s during learning, to perform a bubble sort when inserting a record into said ARL table means, to snoop updates caused by said bubble sort, and to block any updates to records within said ARL table means within one search step of a search being executed.

15. The network device of claim 14, wherein said searches comprise binary searches.

16. The method of claim 15, further comprising a step of:
blocking said updates for one search cycle of said timing signal after any search makes a match.

17. The method of claim 16, wherein said address resolution logic means is configured to perform a bubble sort when inserting a record into said address storage means, and said initiating a search step includes initiating a plurality of searches, and said blocking step comprises blocking updates related to said bubble sort for one search cycle of said timing signal after any search makes a match.

18. The method of claim 17, wherein said blocking step comprises changing a write related to an update into a read for one cycle of said timing signal.

19. The method of claim 16, wherein said blocking step comprises changing a write related to an update into a read for one cycle of said timing signal.

20. The network device of claim 14, wherein said address resolution logic means is configured to block updates caused by said bubble sort for one search cycle of said timing signal when a search finds a matching destination address for said data packet.

21. The network device of claim 20, wherein said address resolution logic means is configured to block updates by changing a data write associated with an update being blocked to a data read for one cycle of said timing signal.

22. The network device of claim 10, wherein said address resolution logic means is configured to block updates by changing a data write associated with an update being blocked to a data read for one cycle of said timing signal.

23. A method for performing searching and learning concurrently within a network device, said method comprising the steps of:
providing a network device comprising at least one port, ARL tables configured to store and maintain data related to port addresses of said network device, and address resolution logic configured to update and insert data into said ARL tables based on a learning function;
receiving a timing signal;
receiving a data packet at a port of said at least one port;
initiating a search in said ARL tables based on said packet; and
performing said search concurrently with and updates to said ARL tables related to said learning function, said searches and updates being performed during alternating slots of said timing signal.

24. The method of claim 23, wherein
said receiving step comprising receiving a plurality of data packets at a plurality of ports of said at least one port, and said initiating step comprises initiating a plurality of searches in parallel based on said plurality of data packets.

25. The method of claim 23, further comprising a steps of:
determining if a data read related to a search hits the same record as a data read related to a learning update, and utilize the data read related to the learning update for said search.

26. The method of claim 25, wherein said utilizing step comprises discarding any data read by said data read related to a search.

* * * * *